US012797722B2

(12) United States Patent
Namaziyan

(10) Patent No.: US 12,797,722 B2
(45) Date of Patent: Nov. 17, 2026

(54) LOGIC TRAINING SOFTWARE UTILIZING A VIRTUAL SENSOR-BASED APPLICATION

(71) Applicant: Funnyem Inc., San Francisco, CA (US)

(72) Inventor: Babak Namaziyan, Burlingame, CA (US)

(73) Assignee: Funnyem Inc., San Francisco, CA (US)

( * ) Notice: Subject to any disclaimer, the term of this patent is extended or adjusted under 35 U.S.C. 154(b) by 184 days.

(21) Appl. No.: 18/782,353

(22) Filed: Jul. 24, 2024

(65) Prior Publication Data

US 2024/0416229 A1 Dec. 19, 2024

Related U.S. Application Data

(63) Continuation-in-part of application No. 18/734,200, filed on Jun. 5, 2024, now abandoned.

(60) Provisional application No. 63/521,279, filed on Jun. 15, 2023.

(51) Int. Cl.
*A63F 13/45* (2014.01)
*A63F 13/52* (2014.01)

(52) U.S. Cl.
CPC .............. *A63F 13/45* (2014.09); *A63F 13/52* (2014.09)

(58) Field of Classification Search
CPC ...... A63F 13/45; A63F 13/52; A63F 13/2145; A63F 13/537
See application file for complete search history.

(56) References Cited

U.S. PATENT DOCUMENTS 6,322,074 B1 * 11/2001 Forrest .................... A63F 9/183 273/272
7,736,222 B2 * 6/2010 Casey ................. G07F 17/3265 463/16
8,167,714 B2 * 5/2012 Tawara ................... A63F 13/00 463/30
8,287,364 B2 * 10/2012 Caputo ................. A01M 1/023 463/19
9,072,969 B2 * 7/2015 Shirakawa .............. A63F 13/10
9,079,097 B2 * 7/2015 Hansson ................. A63F 13/45
10,150,038 B2 * 12/2018 Hazama .................. A63F 13/35
(Continued)

FOREIGN PATENT DOCUMENTS

KR 102310107 B1 10/2021

OTHER PUBLICATIONS

Training A Minesweeper Solver.

*Primary Examiner* — Chase E Leichliter
(74) *Attorney, Agent, or Firm* — KellDann Law PLLC; Kirk Sigmon

(57) ABSTRACT

New and unique game mechanics, systems, and methods are described herein. Logic training software utilizing a virtual sensor-based application as described herein may allow a user to engage with these mechanics, systems, and methods. A game grid may comprise a plurality of tiles and a plurality of sensors. Each tile may correspond to a score and at least one game effect, and each sensor may correspond to one or more tiles. When a user selects a tile on the game grid, a game effect hidden by the tile may be activated, while sensors corresponding to the tile may be activated. The sensors may provide hints as to whether and how many corresponding tiles are hiding negative or positive game effects. The user may increase their score in the game by revealing positive game effects while avoiding negative game effects.

20 Claims, 20 Drawing Sheets

(56) References Cited

U.S. PATENT DOCUMENTS

| | | | | |
|---|---|---|---|---|
| 10,195,534 | B2 * | 2/2019 | Kushner | A63F 13/822 |
| 10,255,763 | B2 * | 4/2019 | Washington | A63F 13/352 |
| 10,699,532 | B2 * | 6/2020 | Caputo | G07F 17/3241 |
| 10,720,005 | B2 * | 7/2020 | Lovell, Sr. | G07F 17/32 |
| 10,874,944 | B2 * | 12/2020 | Graham | A63F 13/822 |
| 2003/0199293 | A1 * | 10/2003 | Skripachev | A63F 13/80<br>463/9 |
| 2015/0141148 | A1 * | 5/2015 | Hansson | A63F 13/23<br>463/36 |
| 2017/0296932 | A1 * | 10/2017 | Kushner | A63F 13/332 |
| 2018/0225929 | A1 * | 8/2018 | Caputo | G07F 17/3241 |
| 2019/0224574 | A1 * | 7/2019 | Lehwalder | G06F 3/04817 |
| 2019/0308102 | A1 * | 10/2019 | Orak | A63F 13/42 |
| 2021/0241570 | A1 * | 8/2021 | Robinson | G07F 17/3265 |
| 2021/0260480 | A1 * | 8/2021 | Afram | A63F 13/80 |
| 2021/0316218 | A1 * | 10/2021 | Twomey | A63F 13/537 |
| 2024/0416229 | A1 * | 12/2024 | Namaziyan | A63F 13/2145 |

* cited by examiner

LOGIC TRAINING SOFTWARE UTILIZING A VIRTUAL SENSOR-BASED APPLICATION

This application claims priority to provisional U.S. Application Ser. No. 63/521,279, filed Jun. 15, 2023 and entitled "LOGIC TRAINING SOFTWARE UTILIZING A VIRTUAL SENSOR-BASED APPLICATION"; and is a Continuation-In-Part of U.S. application Ser. No. 18/734,200, filed Jun. 5, 2024, and entitled "LOGIC TRAINING SOFTWARE UTILIZING A VIRTUAL SENSOR-BASED APPLICATION", each of which is herein incorporated by reference in its entirety for all purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Aspects described herein generally relate to systems and methods of implementing logic training software. More specifically, aspects provide new techniques, instructions, mechanics, methods, and systems involving logic for utilizing and/or executing a virtual sensor-based application, such as a virtual and/or electronic game.

BACKGROUND

Games not only provide entertainment, but also can serve as educational devices to train logical thinking, deductive reasoning, and other mental skills. Logic-based games help educate and improve one's analytical and/or problem solving skills in an enjoyable, recreational manner. Virtual and/or electronic video games provide these benefits in an ever-growing market that constantly demands new and innovative game concepts to reach a wide variety of consumers.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to new and unique mechanics, systems, and methods of providing a logic training software utilizing a virtual sensor-based application.

A first aspect described herein provides methods, systems, and specially configured software and/or computers configured to identify a game grid for a field of play. The game grid may comprise a plurality of tiles and a plurality of sensors. Each tile of the plurality of tiles may correspond to a score and comprise at least one game effect. Each sensor of the plurality of sensors may correspond to one or more tiles, for example, of the plurality of tiles. During gameplay using the game grid user input identifying a first tile may be received. The game grid may be output to a display device. When the user input is received, a game effect associated with the first tile may be activated. Each game effect may be positive, negative, or neutral. Additionally, based on the user input, at least one sensor corresponding to the tile may be updated. Updating the at least one sensor may modify a status of the at least one sensor. The receiving, activating and the updating may be repeated until a predetermined condition is met. The predetermined condition may be and/or comprise depletion of a threshold number of allowed user inputs, revealing all tiles, revealing a threshold number of tiles corresponding to a negative game effect, and/or other predetermined conditions described herein.

In one or more examples, based on the user input, one or more sensors may be enabled. Enabling the one or more sensors may provide a visual cue indicating whether and how many corresponding tiles are hiding negative game effects. The enabling may be repeated until the predetermined condition has been met. In one or more arrangements, the game effect associated with the first tile may comprise a first version of the game effect corresponding to a first tile reveal mode and a second version of the game effect corresponding to a second tile reveal mode.

In one or more examples, based on activating the game effect and based on a score corresponding to the first tile, a total score may be updated. In one or more arrangements, activating a game effect may comprise reducing a score corresponding to the first tile to a value of zero. In one or more examples, activating the game effect may comprise disabling one or more sensors corresponding to the first tile.

In one or more arrangements, the plurality of tiles may comprise a plurality of tiles of a first size and a plurality of tiles of a second size. In one or more examples, one or more tiles corresponding to a sensor may comprise non-adjacent tiles. In one or more arrangements, modifying the status of at least one sensor may comprise changing a displayed color of the sensor.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1A:
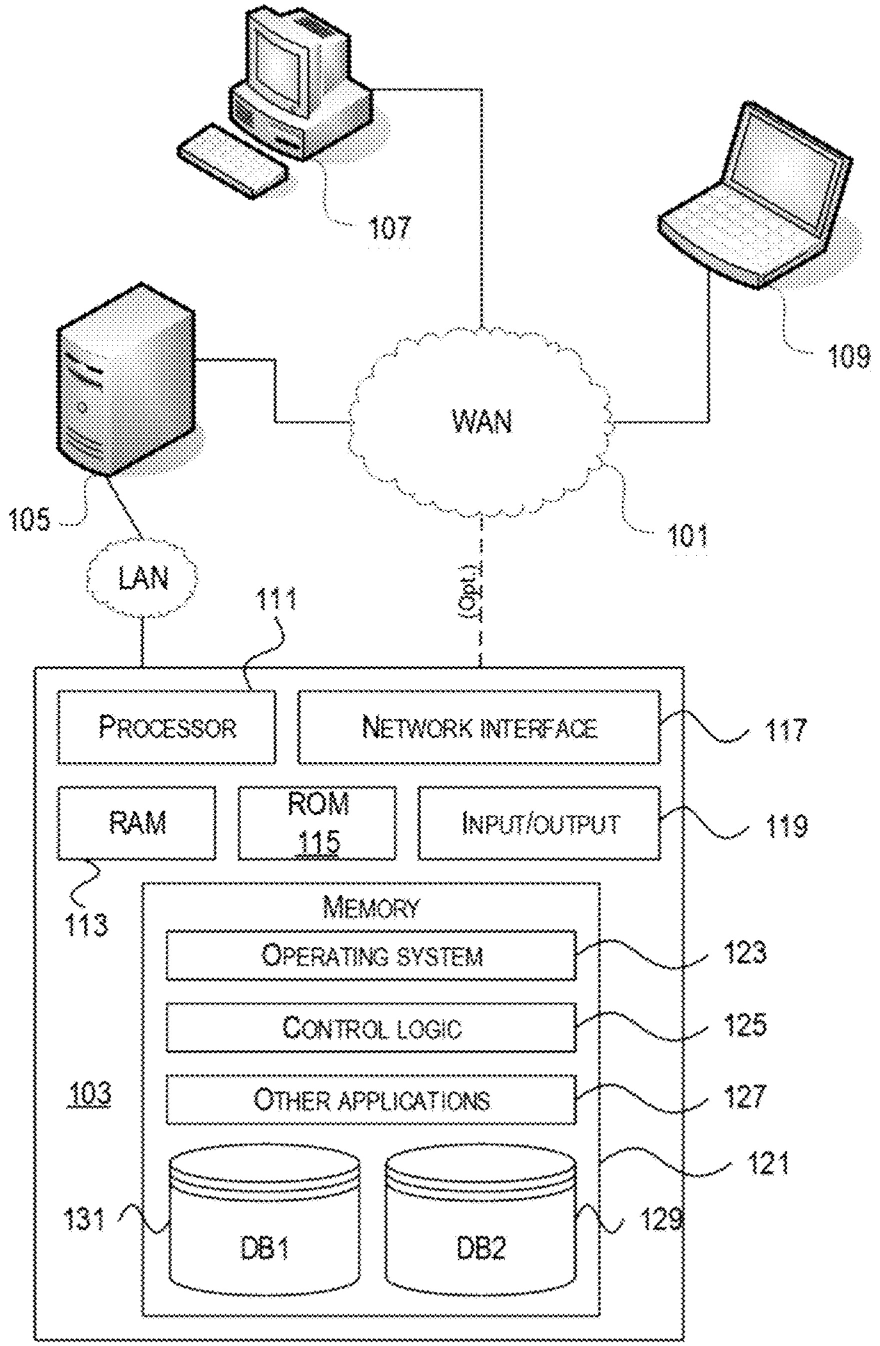
FIGS. 1A-1B depict an illustrative example of a network architecture and data processing device that may be used to provide logic training software utilizing a virtual sensor-based application in accordance with one or more example arrangements.

FIG. 1A illustrates one example of a network architecture and data processing devices that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data-attributable to a single entity-which resides across all physical networks.

The components may include data server 103, second server 105 (e.g., a web server), and client computers 107, 109. Data server 103 provides overall access, control and administration of databases and control software for performing one or more illustrative aspects described herein. Data server 103 may be connected to second server 105 through which users interact with and obtain data as requested. Alternatively, data server 103 may act or include the functionality of the second server itself and be directly connected to the Internet. Data server 103 may be connected to second server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access second server 105 using an Internet browser, as is known in the art, or by executing a software application that communicates with second server 105 and/or data server 103 over a computer network (such as the Internet).

Servers and applications may be combined on the same physical machines, and retain separate virtual or logical addresses, or may reside on separate physical machines. FIG. 1A illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device, e.g., laptops, desktops, tablets, smartphones, servers, micro-PCs, handheld gaming devices, cloud/streaming gaming devices, game consoles, etc. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data server 103, control logic 125 for instructing data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to data server 103. Those of skill in the art will appreciate that the functionality of data server 103 (or device 105, 107, 109) as described herein may be spread across multiple data processing devices, for example, to distribute processing load across multiple computers, to segregate transactions based on geographic location, user access level, quality of service (QoS), etc.

Figure 1B:
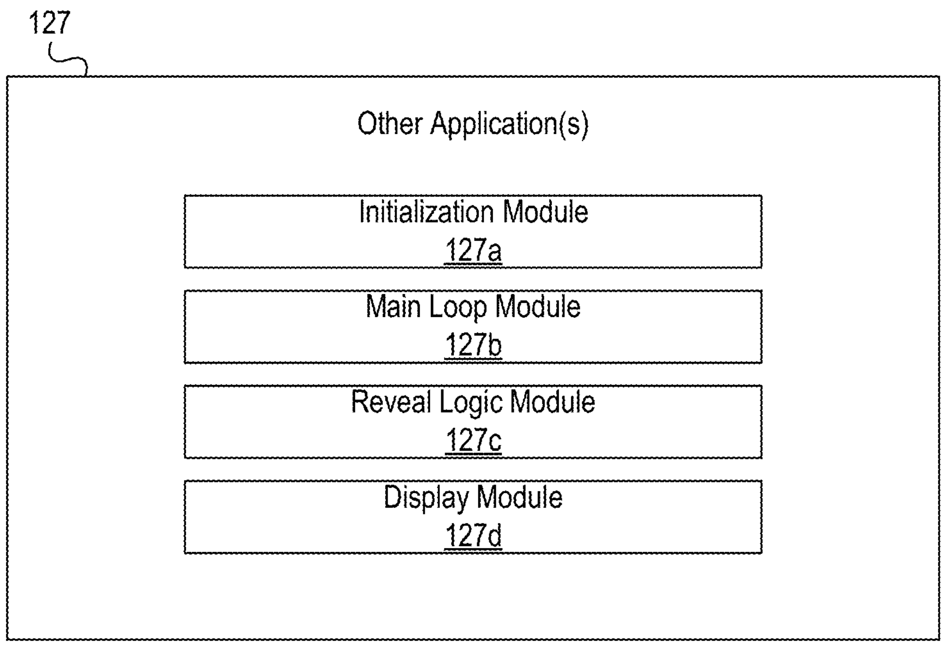

Referring to FIG. 1B, the other application software 127 may include one or more program modules having instructions that, when executed by processor 111, cause component 103, 105, 107, and/or 109 to perform one or more functions described herein. For example, the other application software 127 may have, host, store, and/or include an initialization module 127*a*, a main loop module 127*b*, a reveal logic module 127*c*, a display module 127*d*, and/or other modules. Initialization module 127*a* may have instructions that direct and/or cause one or more computing devices to receive instructions and/or game information for logic training software utilizing a sensor-based application, identify game parameters, generate a game grid, generate one or more randomized game elements, generate a user interface, and/or perform other functions. Main loop module 127*b* may have instructions that direct and/or cause one or more computing devices to receive user input as part of utilizing a sensor-based application, identify and/or execute functions based on user input, and/or perform other functions. Reveal logic module 127*c* may have instructions that direct and/or cause one or more computing devices to identify functions based on user input, implement reveal logic for game elements as part of utilizing a sensor-based application, and/or perform other functions. Display module 127*d* may have instructions that direct and/or cause one or more computing devices to generate and display a graphical user interface as part of executing logic training software utilizing a sensor-based application, and/or perform other functions. The one or more program modules included in the other application software may, in some examples, be accessed, controlled, and/or executed by the operating system 123, control logic 125, and/or other components of memory 121.

One or more aspects described herein provide a recreational and educational tool for providing entertainment and improving one's logic, deductive reasoning, general knowledge, and/or memorization skills. Initial illustrative aspects as described herein may be embodied in a video game utilizing sensor-based gameplay mechanics. The gameplay mechanics may utilize game grids, tiles, sensors, scores, and/or other gameplay mechanics described herein.

Figure 2:
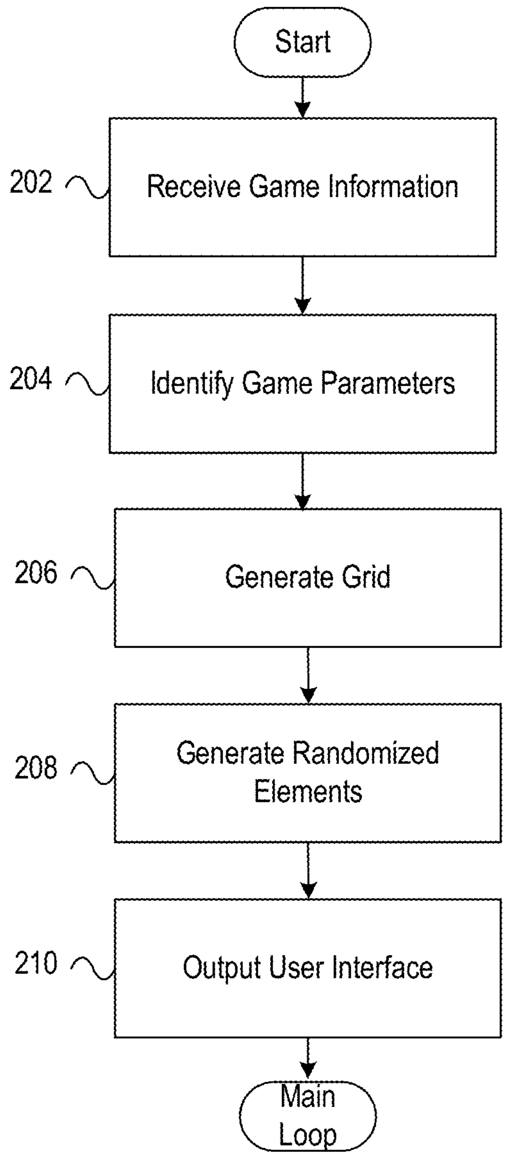
FIG. 2 depicts an illustrative method for initializing logic training software utilizing a virtual sensor-based application in accordance with one or more example arrangements.

FIG. 2 depicts an illustrative method for initializing logic training software utilizing a virtual sensor-based application in accordance with one or more example arrangements. For example, the method may comprise initializing a video game utilizing sensor-based gameplay mechanics. At step 202, a computing device (e.g., client computer 107, 109, and/or other computing devices) may receive game information. For example, the computing device may read the game information from one or more game files stored in memory (e.g., memory 121, or the like). Additionally or alternatively, in some examples, the computing device may receive the game information from a remote computing device, such as a remote server 103 and/or other sources. The game information may comprise logic training software and/or instructions for a video game utilizing sensor-based gameplay mechanics. For example, the game information may comprise game grid information, randomized elements of the game (e.g., awards, hazards, score values for tiles, and/or other randomized elements), gameplay logic (e.g., logic corresponding to a main gameplay loop, logic corresponding to a reveal function of the game, and/or other gameplay logic), and/or any other information used to initialize a video game utilizing sensor-based gameplay mechanics.

Figure 12A:
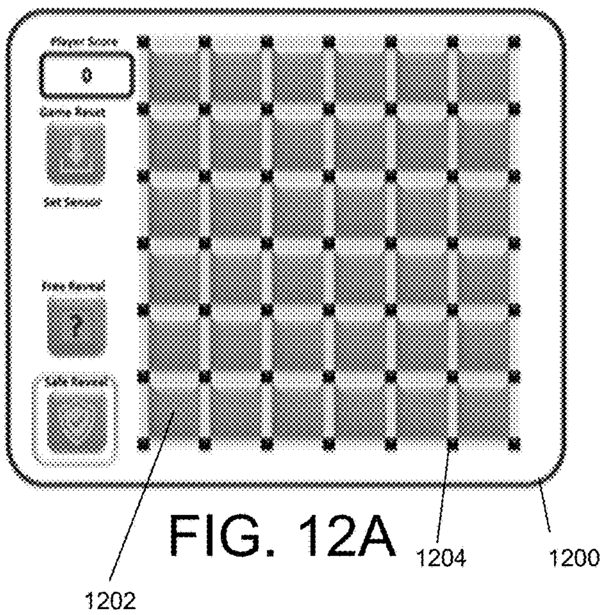
FIGS. 12A-12B depict illustrative game grids of different difficulty levels displayed by a graphical user interface as part of executing logic training software utilizing a virtual sensor-based application in accordance with one or more example arrangements.
Figure 12B:
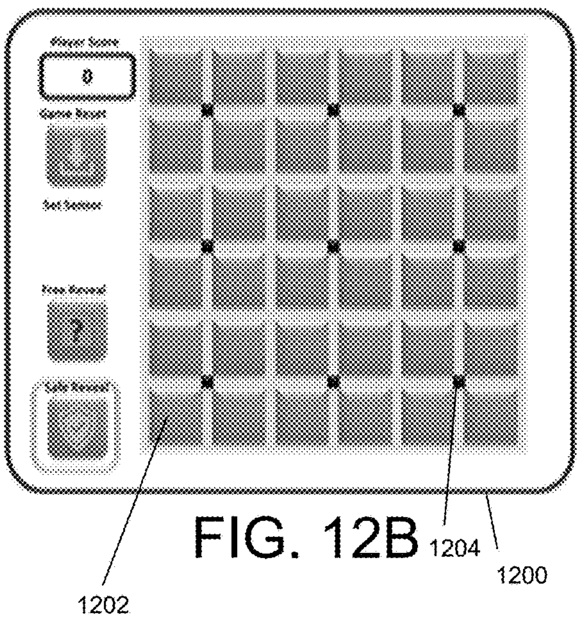

At step 204, the computing device may identify game parameters based on the game information received at step 204. For example, the computing device may read, parse, and/or otherwise analyze the game information to identify game parameters. The game parameters may comprise a number of levels, a size of a game grid, a difficulty level, locations of sensors on the game grid, locations of tiles on the game grid, initial statuses for tiles and/or sensors, randomized elements of the game, and/or other parameters. For example, in identifying the game parameters, the computing device may identify a game grid for a field of play. The game grid may correspond to a level of the game. The game grid may comprise a plurality of tiles and a plurality of sensors. Additionally or alternatively, in some arrangements, the game grid may comprise one or more empty cells. The one or more empty cells may comprise portions of the game grid that contain no tiles or sensors. In some examples, the number of tiles, number of sensors, number of empty cells, and/or other game parameters may be based on a difficulty level of the game. For example, a game corresponding to a first difficulty may correspond to a lower number of sensors than a game corresponding to a second difficulty. Referring to FIG. 12A, a game corresponding to a first difficulty may correspond to game information for a game grid 1200 comprising, for example, thirty-six tiles 1202 and forty-nine sensors 1204. Referring to FIG. 12B, a game corresponding to a second difficulty may correspond to game information for a game grid 1200 comprising, for example, thirty-six tiles 1202 and nine sensors 1204.

Referring again to FIG. 2, a tile may comprise a cell, polygon, or the like with edges and vertices. In identifying the game parameters, the computing device may identify a number corresponding to the plurality of tiles, a shape for each tile of the plurality of tiles, a size for each tile of the plurality of tiles, a position on the game grid for each tile of the plurality of tiles, and/or other information of the plurality of tiles. In some examples, two or more tiles sharing a same vertex and/or a same edge may be considered adjacent on the game grid. Additionally or alternatively, in some examples, in identifying the game parameters, the computing device may identify that one or more tiles of the plurality of tiles partially overlap and/or cover other tiles of the plurality of tiles. In these examples, the computing device may identify that the one or more tiles partially overlapping and/or covering other tiles are adjacent to the overlapped and/or covered tiles on the game grid.

In some examples, each tile of the plurality of tiles may comprise one or more attributes. For example, a tile may comprise attributes such as a content of the tile, a score corresponding to the tile, an award corresponding to the tile, a status of the tile, and/or other attributes. A content of the tile may represent and/or correspond to one or more game effects of the tile that may be revealed during gameplay. In some examples, the content of the tile may be revealed upon initiation of gameplay. In some examples, the content of the tile may be hidden to a player upon initiation of gameplay.

The game effect of each tile may be positive, negative, or neutral. For example, the content of the tile may comprise an empty tile (e.g., a randomized element of the game indicating that the tile comprises no special content and corresponds to a neutral or positive game effect), a hazard (e.g., a randomized element of the game corresponding to a negative game effect, such as a bomb tile, an electromagnetic pulse tile, and/or other hazards), an award (e.g., a randomized element of the game corresponding to a positive game effect, such as a score boost, a multiplier, an increase to a value of a corresponding tile, and/or other positive game effects). The content of the tile may correspond to a graphic, symbol, and/or other visual element of the tile depicting the content (e.g., a bomb, an electromagnetic device, an oil barrel, and/or other visual elements).

In some examples, a single tile may comprise a variable game effect. The variable game effect may comprise a first version of the game effect corresponding to a first tile reveal mode and a second version of the game effect corresponding to a second tile reveal mode. For example, a tile comprising a hazard may comprise a first version of the hazard where, based on user input in a safe reveal mode, the hazard is disabled and a second version of the hazard where, based on user input in a free reveal mode, the hazard is activated. In some examples, identifying the game parameters may comprise randomly generating the content of one or more tiles of the plurality of tiles (e.g., based on one or more instructions in the game information). Additionally or alternatively, in some examples, identifying the game parameters may comprise reading the content of one or more tiles of the plurality of tiles from the game information.

A score attribute may comprise a number (e.g., an integer number, a decimal number, a percentage number, and/or other numbers) corresponding to the tile and indicating the value of the tile. In some examples, the score of the tile may correspond to the content of the tile. For example, an empty tile may correspond to a lower score than a hazard tile. Additionally or alternatively, a tile with a first type of hazard may have a different score than a tile with a second type of hazard. The score of the tile may indicate the value to be added to, or subtracted from, a total game score if the tile is revealed by a user during gameplay. In some examples, identifying the game parameters may comprise randomly generating the scores of one or more tiles of the plurality of tiles (e.g., based on one or more instructions in the game information). Additionally or alternatively, in some examples, identifying the game parameters may comprise reading the scores of one or more tiles of the plurality of tiles from the game information.

An award attribute of a tile may comprise one or more positive game effect activated by revealing the tile. For example, the award attribute may comprise a score modifier, a score multiplier, an awarded input or action, and/or other positive game effects. A status attribute of a tile may comprise one or more states applied to the tile in response to some triggering action (e.g., initiation of a new game, user input, and/or other triggering actions). For example, the status attribute may be and/or comprise a revealed attribute. The revealed attribute may correspond to a false state, indicating that the tile is unrevealed, or a true state, indicating that the tile is revealed. A revealed tile may display (e.g., via a graphical user interface) one or more attributes of the tile (e.g., the score, content, hazard, award, and/or other attributes of the tile). An unrevealed tile may hide, mask, and/or otherwise conceal one or more attributes of the tile (e.g., the score, content, hazard, award, and/or other attributes of the tile). Additionally or alternatively, in some examples, the status attribute may be and/or comprise a damage attribute. The damage attribute may correspond to a false state indicating that the tile is undamaged, or a true state indicating that the tile has been damaged. A damaged tile may comprise a score attribute that is equal to zero. An undamaged tile may comprise a score attribute that is nonzero.

In some examples, in identifying the game parameters, the computing device may identify parameters indicating that one or more tiles of the plurality of tiles comprise status attributes that may be modified based on a triggering action (e.g., user input, a game mechanic corresponding to user input, and/or other triggering actions). For example, the computing device may identify a parameter indicating that a particular user input (e.g., a free reveal action, a safe reveal action, a strike action, and/or other user inputs) may cause a tile with a revealed attribute corresponding to the false state to modify the revealed attribute to correspond to the true state. Additionally or alternatively, in some examples, the computing device may identify a parameter indicating that a particular user input (e.g., a free reveal action, and/or other user inputs) may cause a tile with a damage attribute corresponding to the false state to modify the damage attribute to correspond to the true state.

Figure 7A:
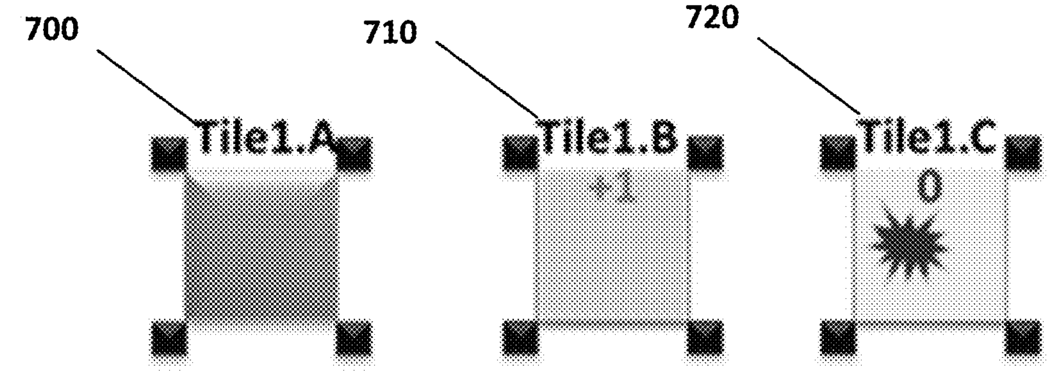
FIGS. 7A-7B depict illustrative tile states generated as part of executing logic training software utilizing a virtual sensor-based application in accordance with one or more example arrangements.
Figure 7B:
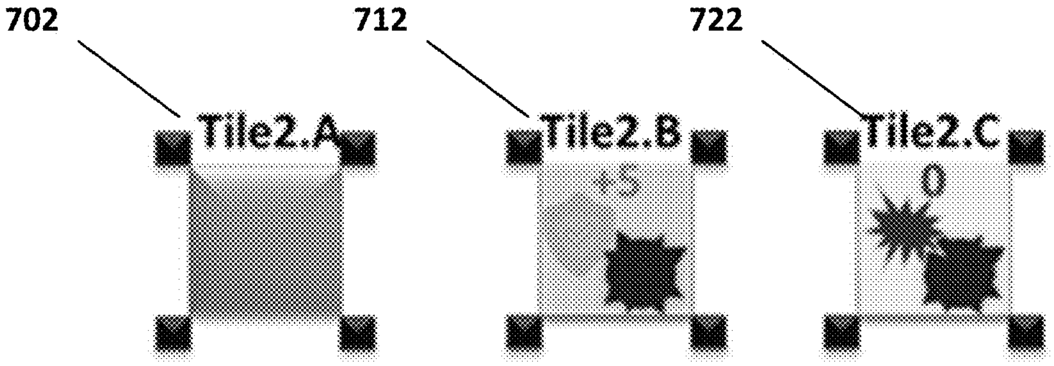

In some examples, in identifying the parameters of the game, the computing device may identify that one or more tiles of the plurality of tiles may comprise different attributes in different states (e.g., different states depicted in FIGS. 7A-7B). FIGS. 7A-7B depict illustrative tile states generated as part of executing logic training software utilizing a virtual sensor-based application in accordance with one or more example arrangements. Referring to FIG. 7A, a tile, such as empty tile 700 (e.g., a tile comprising an empty tile content attribute) may comprise a revealed attribute corresponding to the false state, and the score attribute, content attribute, and/or other attributes may be hidden to the user. The tile may, based on user input, change the revealed attribute to correspond to the true state and reveal a scored empty tile 710 comprising a score attribute equal to one. The score attribute may be added to a total score based on the revealing of scored empty tile 710. Additionally or alternatively, the tile may, based on user input, a game effect corresponding to an adjacent tile, and/or other triggering actions, change the revealed attribute to correspond to the false state, change a damage attribute to correspond to the true state, and reveal a damaged empty tile 720 comprising a score attribute equal to zero.

Referring to FIG. 7B, a tile, such as hazard tile 702, may comprise a revealed attribute corresponding to the true state, a content attribute comprising a bomb hazard, a score attribute hidden to the user, and/or other attributes. The tile may, based on user input corresponding to, for example, a safe reveal game effect, change the revealed attribute to correspond to the true state and reveal a scored hazard tile 712 comprising a score attribute equal to five and a damage attribute corresponding to false. Additionally or alternatively the tile may, based on user input corresponding to, for example, a free reveal game effect, change the revealed attribute to the true state and reveal a damaged hazard tile 722 comprising a damage state corresponding to true and a score attribute equal to zero.

Referring again to FIG. 2 and step 204, in identifying the game parameters, the computing device may identify a game grid comprising a plurality of sensors. A sensor may comprise a portion of the game grid (e.g., a cell, a combination of pixels, or the like). Each sensor of the plurality of sensors may comprise one or more attributes. For example, a sensor may comprise one or more status attributes, a related tiles attribute, a sensor hint attribute, and/or other attributes. The one or more status attributes may comprise an enabled attribute with two states: a true state indicating that the sensor is enabled and a false state indicating that the sensor is disabled. An enabled sensor may display (e.g., via a graphical user interface) a sensor hint corresponding to the sensor hint attribute. A disabled sensor may conceal a sensor hint corresponding to the sensor hint attribute. In some examples, the state of the enabled attribute may be modified by one or more triggering events. For example, upon initiation of a game, the state of the enabled attribute may be false. In these examples, based on user input and/or other triggering events, the state of the enabled attribute may be changed to true. Additionally or alternatively, in some examples, the one or more status attributes may comprise a damage attribute with two states: a true state indicating that the sensor is damaged and a false state indicating that the sensor is undamaged. A damaged sensor may not display a sensor hint corresponding to the sensor hint attribute even if the enabled attribute of the sensor is true. An undamaged sensor may display a sensor hint corresponding to the sensor hint attribute based on the enabled attribute of the sensor being true.

A related tile attribute of a tile may comprise a list, indication, and/or other representation of a set of tiles corresponding to the tile. For example, the related tile attribute may comprise a representation of the set of tiles that are adjacent to the tile. Additionally or alternatively, the related tile attribute may comprise a representation of the set of tiles sharing a row with the tile, the set of tiles sharing a column with the tile, the set of tiles sharing a diagonal with the tile, and/or other sets of tiles corresponding to the tile. In some examples, the related tile attribute may be dynamic. For example, the related tile attribute may comprise a representation of a set of tiles within a particular radius and/or region extending from the location of the sensor. In these examples, the related tile attribute may change over a period of time and/or in response to a trigger condition. Accordingly, the representation of the set of tiles within a particular radius and/or region extending from the location of the sensor may change with the related tile attribute.

A sensor hint attribute of a tile may comprise logic for providing a sensor hint. For example, the sensor hint attribute may comprise logic (e.g., computer logic such as AND logic, XNOR logic, and/or other logic) providing a set of outputs based on different triggering inputs that cause a sensor to display a hint of attributes of tiles corresponding to the sensor. The logic may, for example, cause the sensor to display a particular color (e.g., a black color, and/or other colors), or no color, based on information indicating that the sensor is disabled. The logic may, for example, cause the sensor to display a particular color based on calculating the status of each tile corresponding to the sensor based on information indicating that the sensor is enabled. For example, if all tiles adjacent to a sensor comprise an empty tile content attribute, the logic may cause the sensor to display a green color indicating that there are no hazards adjacent to the sensor. If at least one tile adjacent to the sensor comprises a hazard tile, the logic may cause the sensor to display a red color indicating that there is at least one hazard adjacent to the sensor. In some examples, the logic may cause the sensor to change the displayed sensor hint (e.g., color, and/or other hints) based on recalculating the status of each tile corresponding to the sensor. For example, based on calculations indicating that all hazard tiles adjacent to the sensor have been revealed, the logic may cause the sensor to change display from a red color to a green color. It should be understood that the hints described herein are merely examples and that other colors and/or hints may be used without departing from the scope of this disclosure.

Figure 8A:
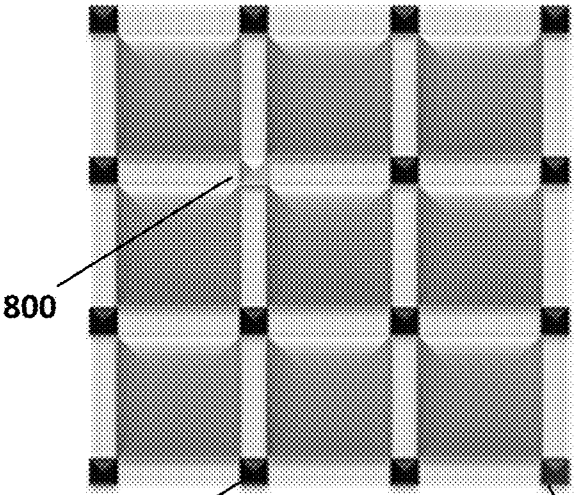
FIGS. 8A-8J depict illustrative sensors generated as part of executing logic training software utilizing a virtual sensor-based application in accordance with one or more example arrangements.
Figure 8B:
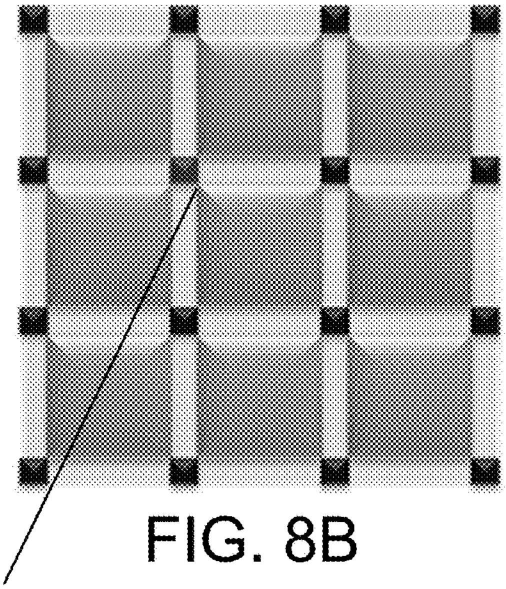
Figure 8C:
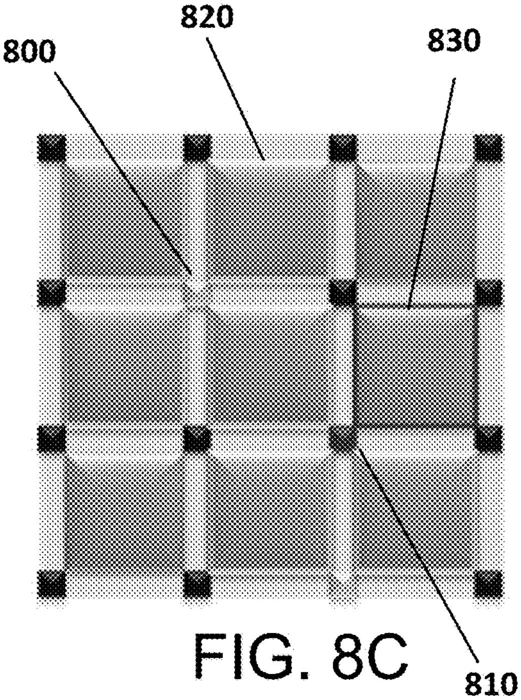
Figure 8D:
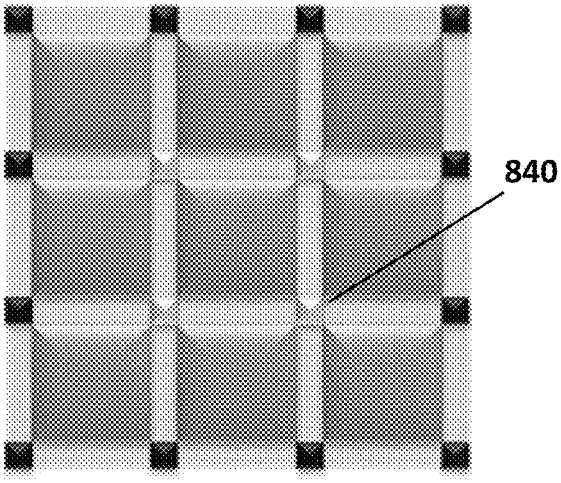

FIGS. 8A-8J depict illustrative sensors generated as part of executing logic training software utilizing a virtual sensor-based application in accordance with one or more example arrangements described herein. Referring to FIG. 8A, an enabled safe sensor 800 may, based on the sensor hint attribute of the sensor, display a color (e.g., green, and/or other colors) as a sensor hint indicating that there are no hazard tiles adjacent to the sensor. A disabled sensor 805 may, based on the sensor hint attribute of the sensor, display a color (e.g., black, and/or other colors) indicating that the sensor is disabled. An enabled hazard sensor 810 may, based on the sensor hint attribute of the sensor, display a color (e.g., red, and/or other colors) as a sensor hint indicating that the tile adjacent to the enabled hazard sensor 810 is adjacent to a hazard. Referring to FIG. 8B, the enabled hazard sensor 810 may, based on the sensor being located in a different position on the game grid, indicate that at least one of the surrounding tiles is a hazard tile. In these examples, the enabled hazard sensor 810 may not display a sensor hint indicating which specific tile, of the adjacent tiles, is a hazard tile.

As described herein, the sensor hint attribute of each sensor may be used to indicate to a user (e.g., a player of the game) the status and/or content attribute of tiles corresponding to the sensor. For example, referring to FIG. 8C, enabled safe sensor(s) 800 may indicate that all adjacent tiles 820 are safe, (e.g., indicating that the adjacent tiles 820 comprise a neutral and/or positive game effect). Enabled hazard sensor(s) 810 may indicate that a particular tile is a hazard tile 830 based on all other tiles corresponding to the hazard sensor(s) 810 being safe. In some examples, sensors comprising a damage attribute in a true state may not display a sensor hint even if the sensor comprises a sensor hint attribute. For example, referring to FIG. 8D, damaged sensor(s) 840 may display a particular color (e.g., gray, and/or other colors) indicating that the sensor is damaged and cannot provide a sensor hint for tiles corresponding to the sensor.

Referring again to FIG. 2 and step 204, in identifying the game parameters the computing device may identify one or more sensors (e.g., of the plurality of sensors) comprising a related tile attribute indicating that a given sensor of the one or more sensors corresponds to one or more tiles that are non-adjacent to the given sensor. For example, referring to FIG. 8E, a sensor 850 may comprise a related tiles attribute indicating that the sensor 850 corresponds to each tile within one diagonal space on a grid from the sensor 850. Additionally or alternatively, a sensor 855 may comprise a related tiles attribute indicating that the sensor 855 corresponds to each tile sharing an edge with the sensor 855.

Figures 8E, 8F, 8G, 8H:
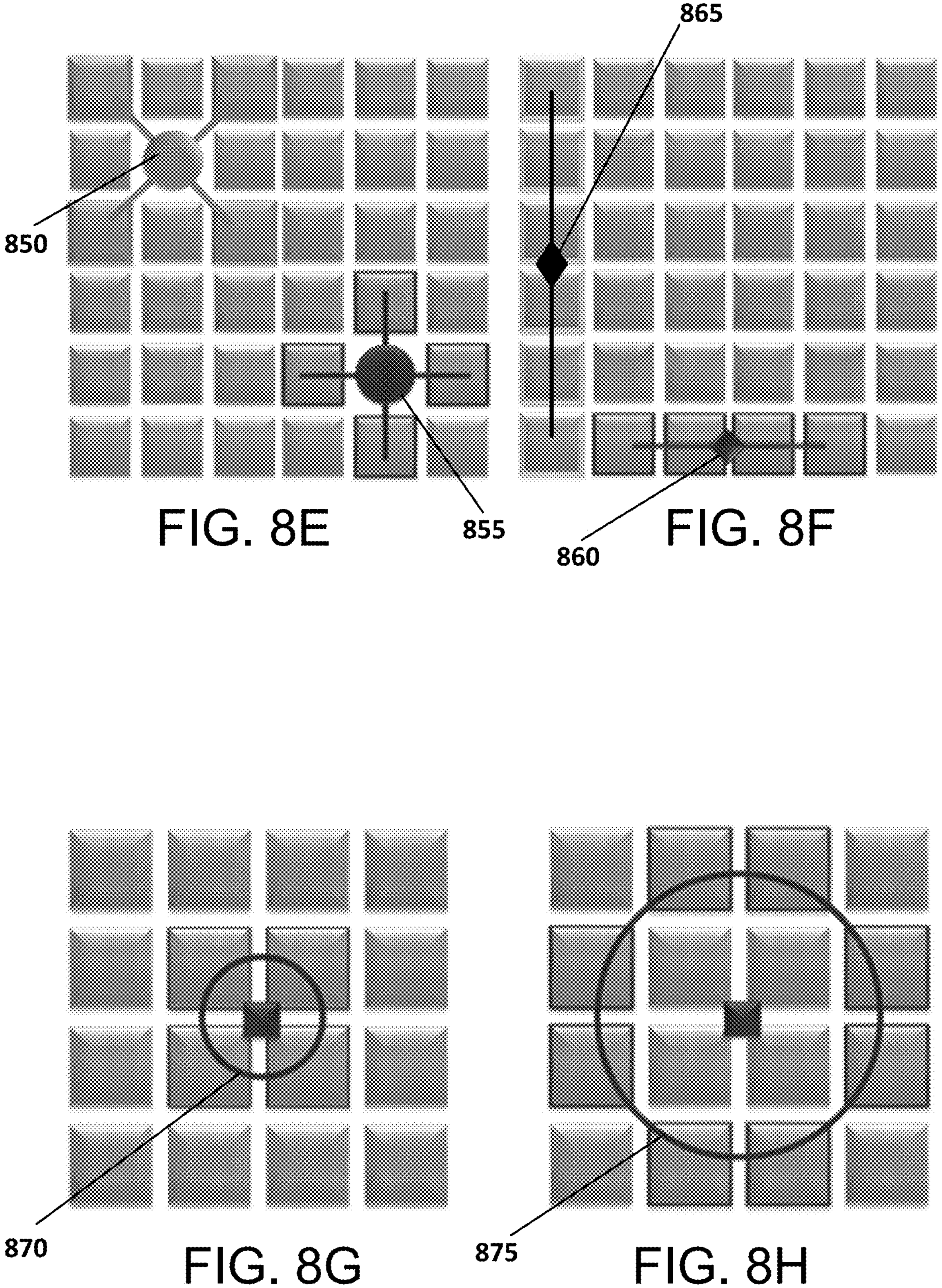
Figure 8I:
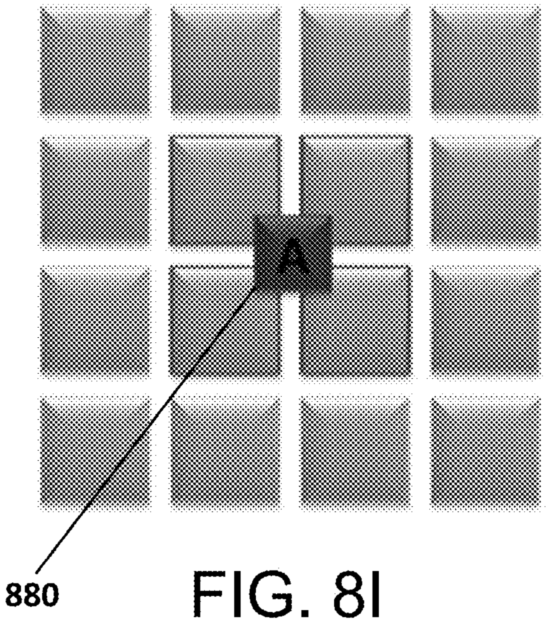

Additionally or alternatively, in some examples, a sensor may comprise a related tiles attribute indicating that the sensor corresponds to a plurality of tiles within a particular distance and/or number of tiles from the sensor in a horizontal direction, a vertical direction, a diagonal direction, and/or any other distance and/or direction. For example, referring to FIG. 8F, a sensor 860 may comprise a related tiles attribute indicating that the sensor 860 corresponds to each tile within a number of horizontal spaces on a grid from the sensor 860. Additionally or alternatively, a sensor 865 may comprise a related tiles attribute indicating that the sensor 865 comprises a related tiles attribute indicating that the sensor 865 corresponds to each tile within a number of vertical spaces on a grid from the sensor 865. Additionally or alternatively, in some examples, a sensor may comprise a related tiles attribute indicating that the sensor corresponds to a plurality of tiles within a particular radius, region, or the like extending from the location of the sensor. In these examples, the computing device may additionally identify that the sensor comprises an animation parameter indicating that an animation will be displayed on a game grid. The animation may indication the plurality of tiles corresponding to the sensor. For example, referring to FIG. 8G, an animation start radius 870 may indicate a first subset of tiles of the plurality of tiles corresponding to the sensor. Referring to FIG. 8H, an animation end radius 875 may indicate a second subset of tiles of the plurality of tiles corresponding to the sensor.

Referring again to FIG. 2 and step 204, in identifying the game parameters the computing device may identify one or more sensors (e.g., of the plurality of sensors) comprising a related tiles attribute corresponding to a logical operation. For example, the one or more sensors may comprise a sensor hint attribute corresponding to a Boolean logic AND function, a XNOR function, and/or other logical operations. In some examples, the sensor hint attribute may indicate that the respective sensor will display a sensor hint corresponding to the logical operation of the related tiles attribute. For example, referring to FIG. 81, the computing device may identify an AND sensor 880 comprising a sensor hint attribute displaying a sensor hint indicating that the sensor uses AND logic. Accordingly, the AND sensor 880 may display a color (e.g., red, green, and/or other colors) based on applying an AND operation to the related tiles of the sensor. For example, based on applying an AND operation to identify that no related tiles of the AND sensor 880 are hazard tiles, the AND sensor 880 may display a color (e.g., green, and/or other colors) indicating that there are no hazard tiles adjacent to the AND sensor 880. Based on applying an AND operation to identify that at least one related tile of the AND sensor 880 is a hazard tile, the AND sensor 880 may display a different color (e.g., red, and/or other colors) indicating that at least one tile adjacent to the AND sensor 880 is a hazard tile.

Figure 8J:
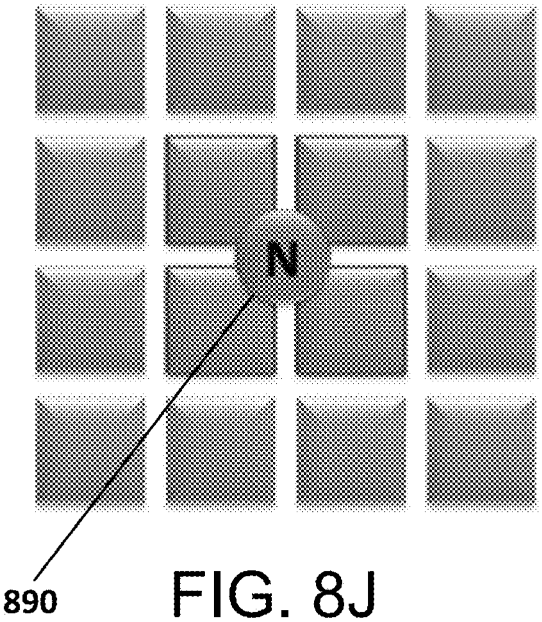

Additionally or alternatively, referring to FIG. 8J, the computing device may identify a XNOR sensor 890 comprising a sensor hint attribute displaying a sensor hint indicating that the sensor uses a specific type of logic (e.g., XNOR logic, or the like). Accordingly, the XNOR sensor 890 may display a color (e.g., red, green, and/or other colors) based on applying a logical (e.g., XNOR, and/or other logic) operation to the related tiles of the sensor. For example, based on applying a XNOR operation to identify that all of the related tiles of the sensor share a same content attribute (e.g., hazard, empty tile, and/or other content attributes), the XNOR sensor 890 may display a color (e.g., green, and/or other colors) indicating that all tiles adjacent to the XNOR sensor 890 share the same content attribute. Based on applying a XNOR operation to identify that at least one related tile of the XNOR sensor 890 has a different content attribute to another related tile of the XNOR sensor 890, the XNOR sensor 890 may display a different color (e.g., red, and/or other colors) indicating that at least one tile adjacent to the XNOR sensor 890 is corresponds to a different content attribute. It should be understood that the sensors described herein are merely exemplary, and that the computing device may identify one or more different sensors comprising different attributes without departing from the scope of this disclosure.

Referring again to FIG. 2 and step 204, in identifying the game parameters the computing device may identify one or more elements (e.g., randomized elements, and/or other elements) of the game. The one or more elements may comprise game effect corresponding to the content attributes of one or more tiles. For example, as described herein, the content of a tile may comprise an empty tile (e.g., a randomized element of the game indicating that the tile comprises no special content and corresponds to a neutral or positive game effect), a hazard (e.g., a randomized element of the game corresponding to a negative game effect, such as a bomb tile, an electromagnetic pulse tile, and/or other hazards), an award (e.g., a randomized element of the game corresponding to a positive game effect, such as a score boost, a multiplier, an increase to a value of a corresponding tile, and/or other positive game effects), and/or other game effects. In some examples, the computing device may identify one or more parameters and/or attributes for each identified game effect.

Figure 9A:
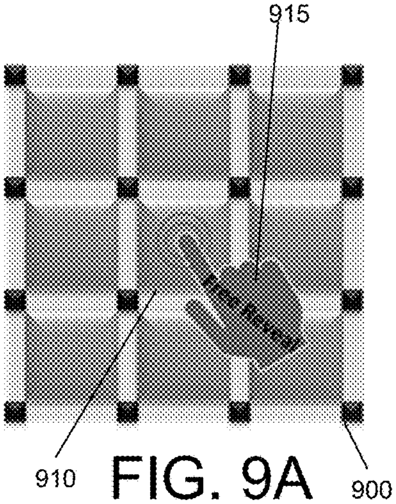
FIGS. 9A-9I depict illustrative game mechanics generated as part of executing logic training software utilizing a virtual sensor-based application in accordance with one or more example arrangements.

Additionally or alternatively, in some examples, the computing device may identify one or more parameters and/or attributes for hazard game effects. For example, the computing device may identify an armed attribute, a triggered attribute, an effects attribute, a type attribute, and/or any other attributes for hazard game effects. An armed attribute of a hazard may comprise a plurality of states. For example, a true state may indicate that the hazard is armed and will trigger an effect when the hazard is revealed. For example, referring to FIG. 9A, a game grid comprising a plurality of sensors 900 and a plurality of tiles 910 may receive user input 915 (e.g., a free reveal action, or the like) causing the hazard to be revealed and triggering the effect. A false state may indicate that the hazard is not armed and cannot be triggered. A triggered attribute of a hazard may comprise a plurality of states. A true state may indicate that the hazard has been revealed (e.g., using a free reveal action) and may cause the effect corresponding to the hazard to occur. A false state may indicate that the hazard is not triggered.

Figure 9B:
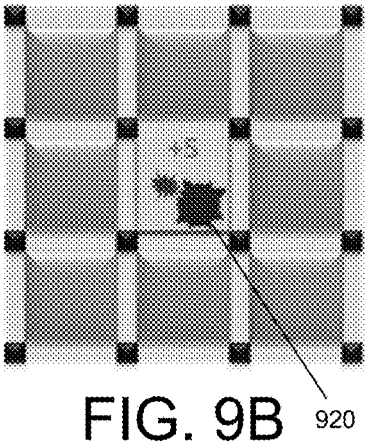
Figure 9C:
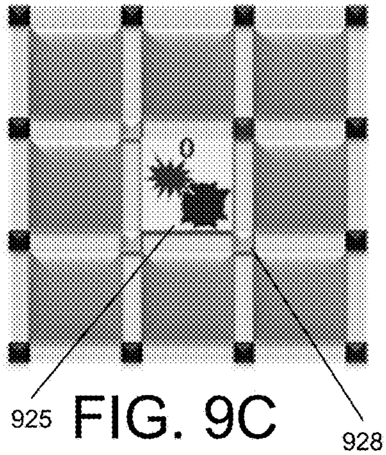

An effects attribute of a hazard may indicate an effect that will occur if the hazard is armed and triggered. For example, the effects attribute may comprise a damage effect causing the tile corresponding to the hazard and/or other tiles to be damaged (e.g., by setting the score attribute of the tile to zero, and/or otherwise damaging the tile), a break effect causing one or more sensors adjacent to the tile corresponding to the hazard and/or other sensors to be broken (e.g., by setting the enabled attribute of the one or more sensors to a false state, and/or otherwise breaking the one or more sensors), and/or other effects. For example, referring to FIG. 9B, based on receiving user input (e.g., a free reveal action, or the like) a tile may reveal a damaging hazard 920. The damaging hazard 920 may, based on being armed and triggered by the reveal of the tile, activate the damage effect causing the tile corresponding to the damaging hazard 920 to be damaged. For example, referring to FIG. 9C, a damaging effect activated by a damaging hazard may create a damaged tile 925. The damaged tile 925 may comprise an indication that the tile is damaged and a score attribute equal to zero. In some examples, a damaging hazard may activate one or more additional effects. For example, the damaging hazard may activate adjacent sensors 928 corresponding to the damaged tile 925.

Figure 9D:
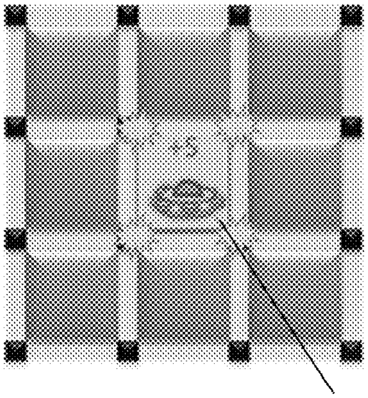
Figure 9E:
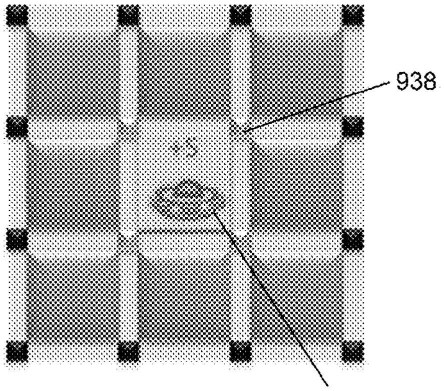

Additionally or alternatively, in some examples the effects attribute may comprise a break effect, as illustrated in FIGS. 9D-9E. Referring to FIG. 9D, based on receiving user input (e.g., a free reveal action, or the like) a tile may reveal a breaking hazard 930. The breaking hazard 930 may, based on being armed and triggered by the reveal of the tile, activate the break effect causing the sensors corresponding to the breaking hazard 930 to break. For example, referring to FIG. 9E, a break effect activated by a breaking hazard may create a breaking tile 935. The breaking tile 935 may comprise an indication that the tile broke adjacent sensors. In some examples, the break effect may additionally or alternatively break one or more sensors 938. Breaking the one or more sensors 938 may cause the one or more sensors 938 to disable any sensor hints displayed by the one or more sensors 938.

Figure 9F:
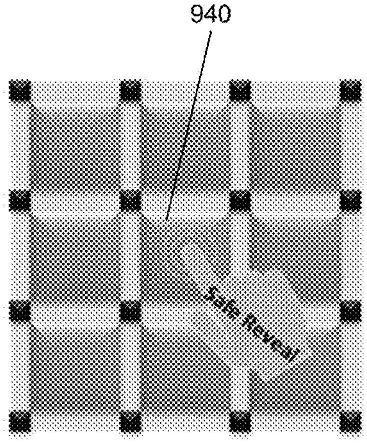
Figure 9G:
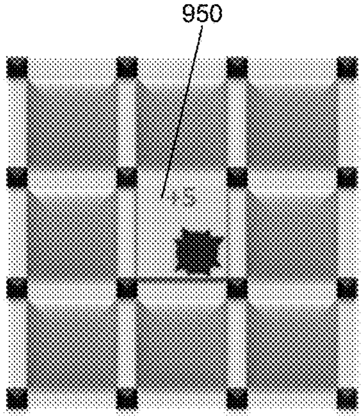
Figure 9H:
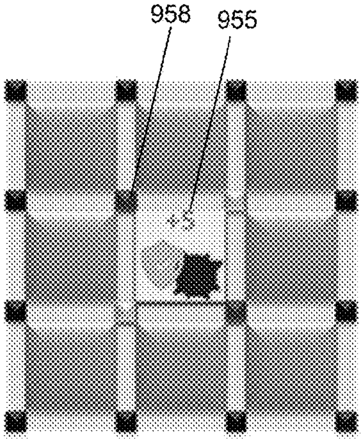

Additionally or alternatively, in some examples, the effects attribute may comprise a safe reveal effect. In some examples, the safe reveal effect may supersede another effects attribute (e.g., a damage effect, a break effect, or the like) based on a triggering condition. The safe reveal may, for example, based on user input corresponding to a safe reveal mode, the safe reveal effect may cause a tile comprising a break effect and/or a damage effect to be revealed without activating a hazard (e.g., by forcing the triggered attribute to be set to false, and/or by other methods). For example, referring to FIG. 9F, a safe reveal user input 940 selecting a tile on a game grid may activate the safe reveal effect. Referring to FIG. 9G, an activated safe reveal effect may reveal a disarmed hazard tile 950. The disarmed hazard tile 950 may comprise a visual indicator (e.g., a graphic, a text notification, or the like) indicating that the tile comprised a hazard that has been disarmed. Referring to FIG. 9H, based on revealing a disarmed hazard tile, a disarm score 955 may be awarded (e.g., based on a score attribute of the tile) and adjacent sensors 958 may be enabled.

The examples of award game effects, hazard game effects and/or hazard effects attributes described herein are merely examples. Additional or alternative hazard game effects and/or hazard effects attributes may be identified by the computing device (e.g., as described herein with respect to step 204 of FIG. 2). For example, the effects attribute of a hazard may comprise a burning effect configured to decrease (e.g., in a single instance and/or periodically over a fixed period of time) a score attribute corresponding to one or more tiles, a spreading effect configured to modify the content attribute of one or more adjacent tiles such that the content attribute of the one or more adjacent tiles comprises a hazard, a healing effect configured to reset the score attribute of one or more tiles and/or to remove a damage status from one or more tiles, a cleaning effect configured to remove a hazard from one or more tiles, a fixing effect configured to repair one or more broken sensors, an activation effect configured to enable one or more sensors, and/or any other game effects.

A type attribute of a hazard may comprise a label, name, and/or other indication of the type of hazard. For example, a hazard comprising a damaging effect attribute may additionally comprise a type attribute indicating that the hazard is a damaging hazard. A hazard comprising a breaking effect attribute may comprise a type attribute indicating that the hazard is a breaking hazard. It should be understood that the hazard attributes described herein are merely examples and that one or more additional and/or different attributes may be identified by the computing device without departing from the scope of this disclosure.

Additionally or alternatively, in some examples, the computing device may identify one or more parameters and/or attributes for award game effects. For example, the computing device may identify a triggered attribute, an effects attribute, a type attribute, and/or any other attributes for award game effects. A triggered attribute of an award may comprise a plurality of states. A true state may indicate that the award has been revealed (e.g., using a free reveal action) and may cause the effect corresponding to the award to occur. A false state may indicate that the award is not triggered. A type attribute of an award may indicate what effects, visual elements, and/or other traits correspond to the award. For example, the type attribute may indicate that an award tile is an oil barrel tile corresponding to a score boost effect, as described herein with respect to FIG. 9I. An effects attribute of an award may indicate an effect that will occur if the award is triggered. For example, the computing device may identify that an award game effect causes, based on the tile corresponding to the award game effect being revealed, activation of a score multiplier, a score boost, an increase to a score of a corresponding tile, safe reveal of a number of randomized tiles on the game grid, enabling of a number of sensors, and/or any other positive game effects.

Figure 9I:
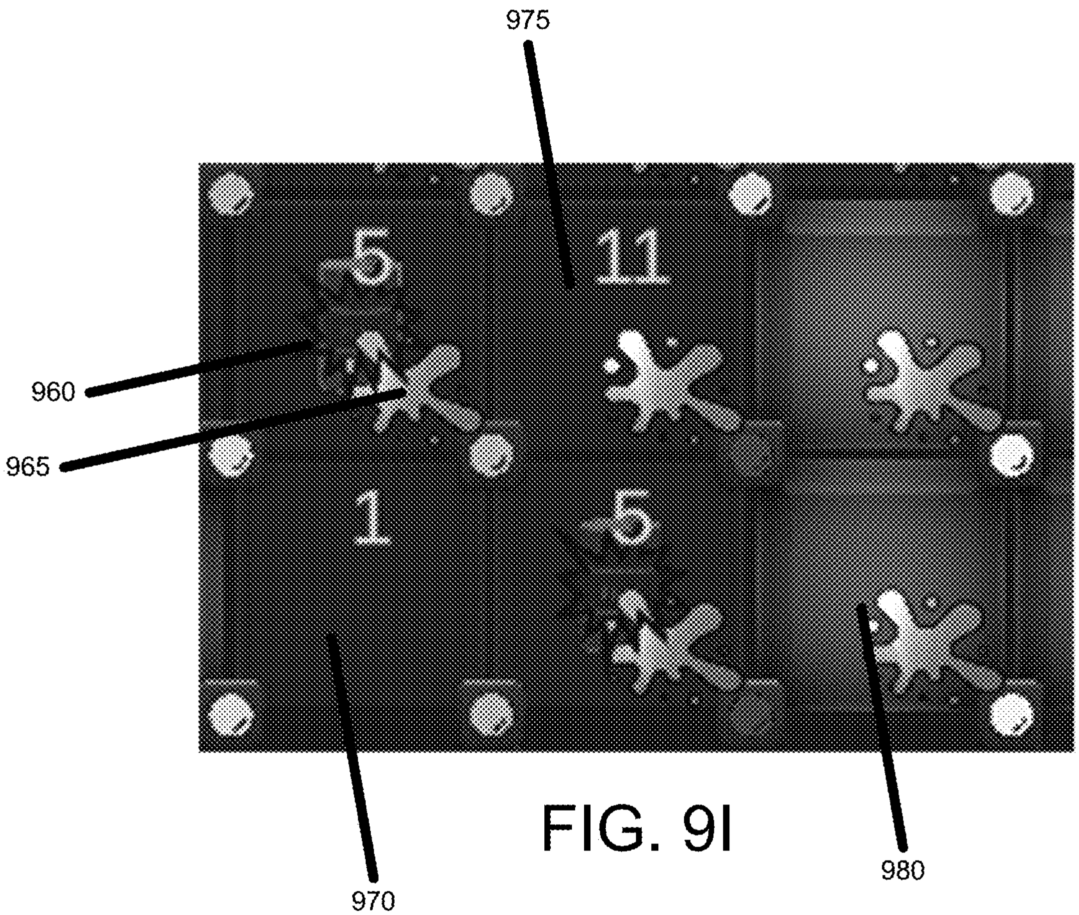

For example, referring to FIG. 9I, one or more award tiles 960 may, based on user input (e.g., a free reveal action, or the like) trigger an effect corresponding to the award. In some examples, the one or more award tiles 960 may be and/or comprise, for example, oil barrel tiles comprising a score boost effect attribute. The score boost effect attribute may increase the score of adjacent tiles by a predetermined amount. In some examples, the score boost effect may be configured to increase the score only of unrevealed adjacent tiles. For example, a previously revealed tile 970 may not be affected by the reveal of the one or more awards tiles 960. In these examples, unrevealed tiles, such as tiles 975 and 980, may receive a score boost increasing the score for safely revealing the tiles. For example, as shown in FIG. 9I, boosted tile 975 may, based on being revealed, increase a score of the game by eleven points while previously revealed tile 970 increases the score of the game by, for example, one point. Unrevealed tile 980 may, based on future user input, increase a score of the game by the same amount of points as boosted tile 975. In some examples, the effect corresponding to the award may comprise providing an indicator of the effect. For example, a score boost effect as depicted in FIG. 9I may cause an image 965 (e.g., an oil spill image, and/or other images) to be displayed on a predetermined group of tiles. The image 965 may, for example, be displayed on each tile affected by the reveal of the one or more awards tiles 960.

Referring again to FIG. 2, at step 206, the computing device may generate a game grid. The computing device may generate the game grid based on, for example, the game parameters identified at step 204, as described herein. For example, the computing device may generate the game grid based on game parameters such as a size of a game grid, locations of sensors on the game grid, locations of tiles on the game grid, initial statuses for tiles and/or sensors, randomized elements of the game, and/or other parameters. A game grid may comprise a play area, board game, or level of the game corresponding to the sensor-based application described herein. The game grid may additionally or alternatively comprise a plurality of sensor, tiles, and/or other components of a sensor-based application described herein.

Figure 6A:
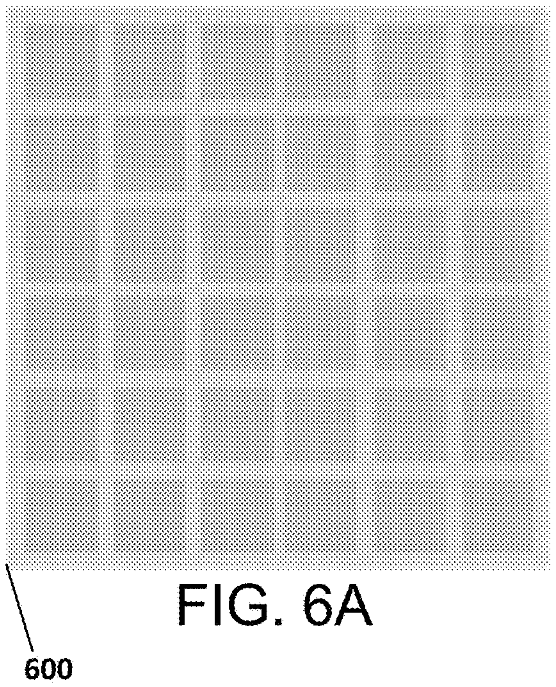
FIGS. 6A-6H depict illustrative game grids generated as part of executing logic training software utilizing a virtual sensor-based application in accordance with one or more example arrangements.

The game grid may be similar to one or more game grids depicted in FIGS. 6A-6H. Referring to FIG. 6A, an example game grid 600 may initially be generated (e.g., as described at step 206 with respect to FIG. 2) by the computing device with a plurality of cells for placing game elements (e.g., tiles, sensors, and/or other game elements). In generating the game grid, the computing device may generate, based on identified game parameters, a plurality of sensors and a plurality of tiles at particular positions within the game grid.

Figure 6B:
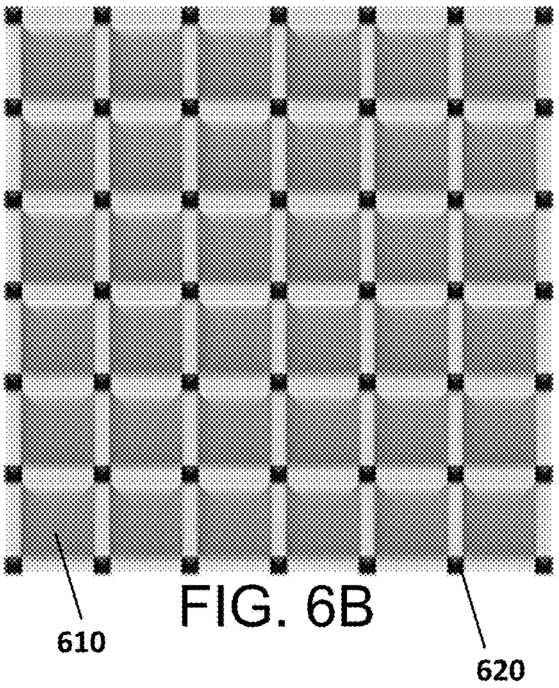

For example, referring to FIG. 6B, the computing device may generate a game grid comprising a plurality of tiles 610 positioned at grid squares in the game grid and a plurality of sensors 620 positioned at the vertices of each tile of the plurality of tiles 610. It should be understood that the plurality of tiles 610 and plurality of sensors 620 depicted in FIG. 6B are merely examples and that a game grid may comprise tiles with different shapes, different colors, different positions, and/or other differences. The game grid may additionally or alternatively comprise sensors with different sizes, different shapes, different positions, and/or other differences.

Figure 6C:
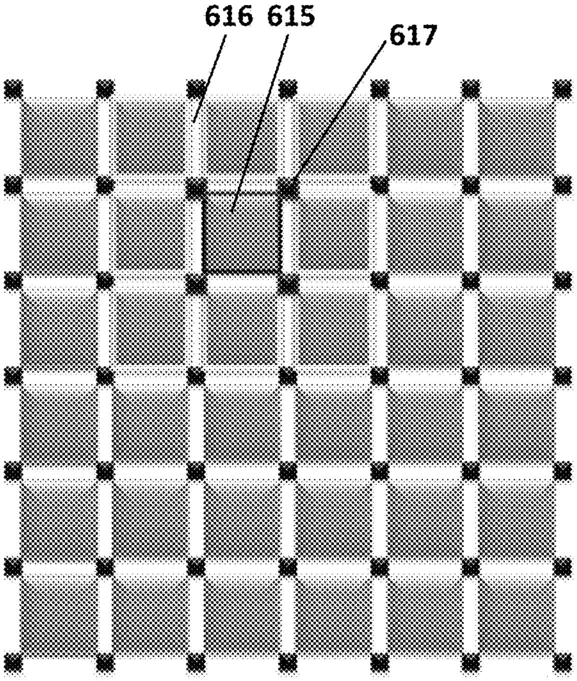
Figure 6D:
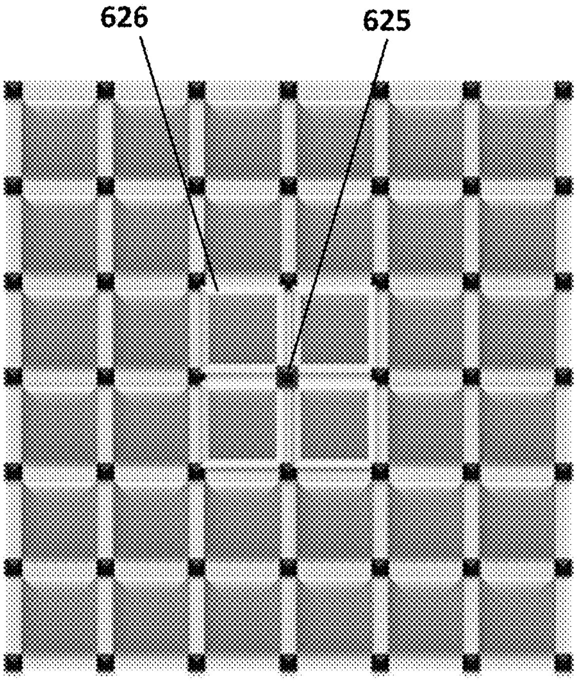
Figure 6E:
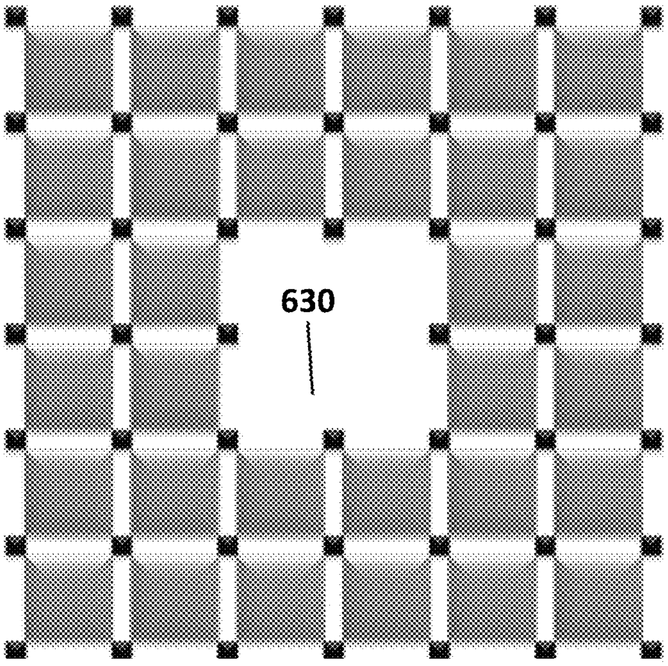
Figure 6F:
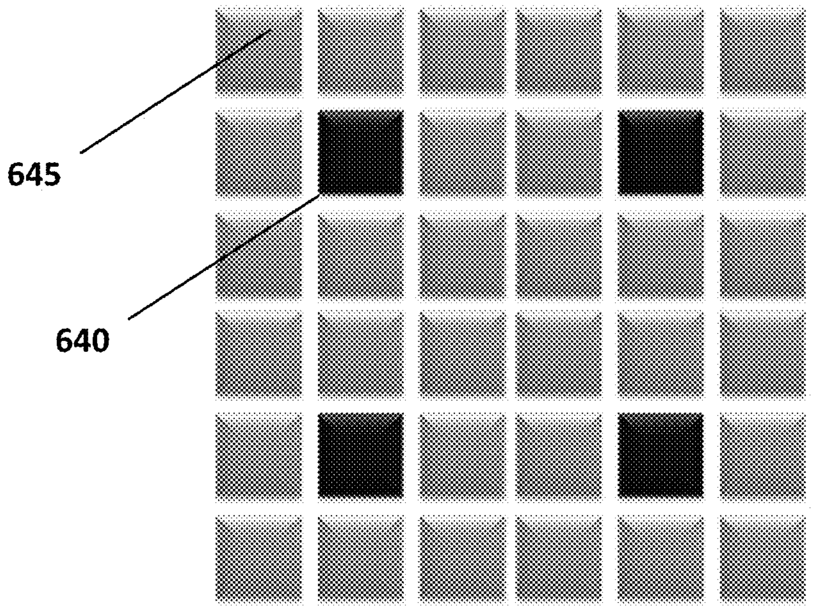
Figure 6G:
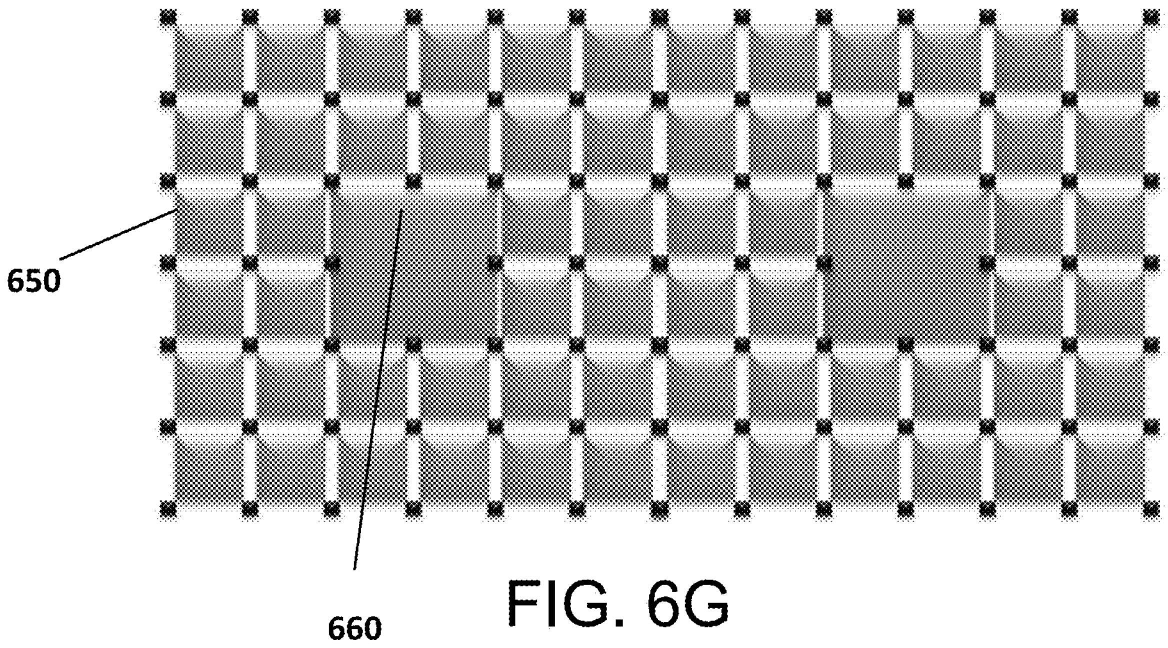
Figure 6H:
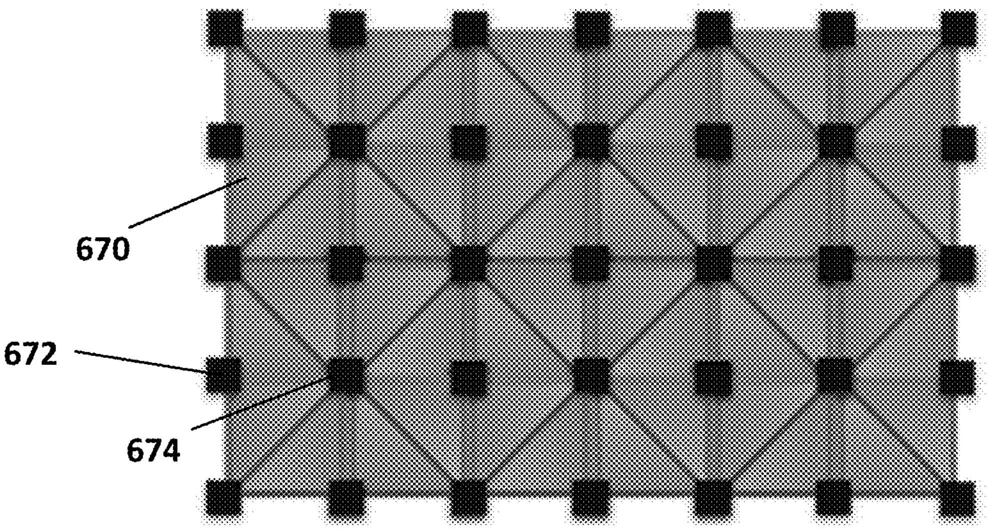

Referring again to FIG. 2 and step 206, in some examples, in generating the game grid the computing device may generate a game grid comprising visual markers, code, and/or other indications or information representing relationships between tiles and/or sensors. For example, as shown in FIGS. 6C-6D, the game grid may comprise indications and/or data representing relationships between adjacent tiles and/or sensors. Referring to FIG. 6C, a game grid may comprise a tile 615 with relationships to adjacent tiles based on information indicating that the tiles share an edge 616 and/or a sensor 617. Additionally or alternatively, referring to FIG. 6D, a game grid may comprise a sensor 625 with relationships to adjacent tiles 626 based on information indicating that the sensor 625 is located at a shared vertex of adjacent tiles 626.

Referring again to FIG. 2 and step 206, in some examples, the computing device may generate a game grid with one or more additional or alternative elements and/or configurations. The game grid may comprise, for example, one or more empty cells. In some examples, an empty cell may not correspond to any game effects and/or functions. An empty cell may occupy a plurality of positions on the game grid. In some examples, the game grid may comprise one or more empty cells in order to modify the difficulty, cosmetics, and/or other aspects of the game. An empty cell may be displayed (e.g., via a graphical user interface) as a blank and/or void space on the game grid. For example, referring to FIG. 6E, a game grid may comprise an empty cell 630. Referring again to FIG. 2 and step 206, an empty cell may additionally or alternatively comprise one or more user interface elements (e.g., game information, game controls, or the like).

In some examples, the computing device may generate a game grid comprising one or more variant cells. For example, the one or more variant cells may comprise one or more three-dimensional shapes. One or more tiles, of the plurality of tiles of the game grid, may be displayed as a three-dimensional shape (e.g., a building, or the like). Additionally or alternatively, one or more sensors, of the plurality of sensors of the game grid, may be displayed as a three-dimensional shape (e.g., a power tower, or the like). Additionally or alternatively, in some examples, the one or more variant cells may comprise tiles and/or sensors with different sizes, shapes, positions, and/or other variations. For example, referring to FIG. 6F, a game grid may comprise a plurality of sensors 640 and a plurality of tiles 645 of equal size and shape. The plurality of sensors 640 may be placed adjacent to edges of tiles of the plurality of tiles 645 rather than, for example, vertices of tiles of the plurality of tiles 645. Additionally or alternatively, referring to FIG. 6G, a game grid may comprise a plurality of tiles of a first size 650 and a plurality of tiles of a second size 660. The plurality of tiles of the first size 650 may each correspond to four sensors, while the plurality of tiles of the second size 660 may each correspond to eight sensors. Additionally or alternatively, referring to FIG. 6H, the game grid may comprise a plurality of triangle tiles 670 rather than, for example, square tiles. The game grid may comprise sensors corresponding to different numbers of tiles. For example, border sensors 672 may each correspond to two triangle tiles 670, while interior sensors 674 may each correspond to eight triangle tiles 670.

It should be understood that the game grids described herein are merely examples. The computing device may generate game grids, based on identified game parameters, with additional and/or alternative sizes, configurations, tiles, sensors, dimensions (e.g., two-dimensional, three-dimensional, or the like), and/or other parameters without departing from the scope of this disclosure.

Referring again to FIG. 2, at step 208, the computing device may generate randomized elements of a game. The computing device may generate the randomized elements of the game based on parameters identified at step 204. The randomized elements may comprise attributes of tiles (e.g., a content of the tile, a score corresponding to the tile, an award corresponding to the tile, a status of the tile, and/or other attributes described herein), attributes of sensors (e.g., status attributes, a related tiles attribute, a sensor hint attribute, and/or other attributes described herein), negative game effects (e.g., a number of hazards, a type of hazard corresponding to a tile comprising the hazard content attribute, or the like), positive game effects (e.g., a number of awards, a type of award corresponding to a tile comprising the award content attribute, or the like), neutral game effects (e.g., a number of empty tiles, user interface elements (e.g., art, colors, graphics, or the like), and/or other randomized elements. In some examples, the generating the randomized elements may comprise generating visual indicators of the randomized elements on a graphical user interface comprising the game grid. For example, the randomized elements may comprise visual indicators such as those depicted in FIGS. 7A-7B, 8A-8J, and/or 9A-9I as described herein.

Additionally or alternatively, in some examples, generating the randomized elements may comprise activating and/or preparing randomized elements hidden by tiles on the game grid (e.g., hazards, awards, or the like) prior to user input revealing the tiles. For example, generating randomized elements may comprise activating and/or preparing hazards such as those described herein with respect to FIGS. 2 and 9A-9I.

At step 210, the computing device may output a user interface. In outputting the user interface, the computing device may output a user interface displaying the game grid and/or randomized elements generated at steps 206-208, as described herein. In some examples, the user interface may display a game interface configured to receive user input related to the game grid generated at step 206. In displaying the user interface, the computing device may display a game interface similar to game interface 1000, which is illustrated in FIG. 10.

Figure 10:
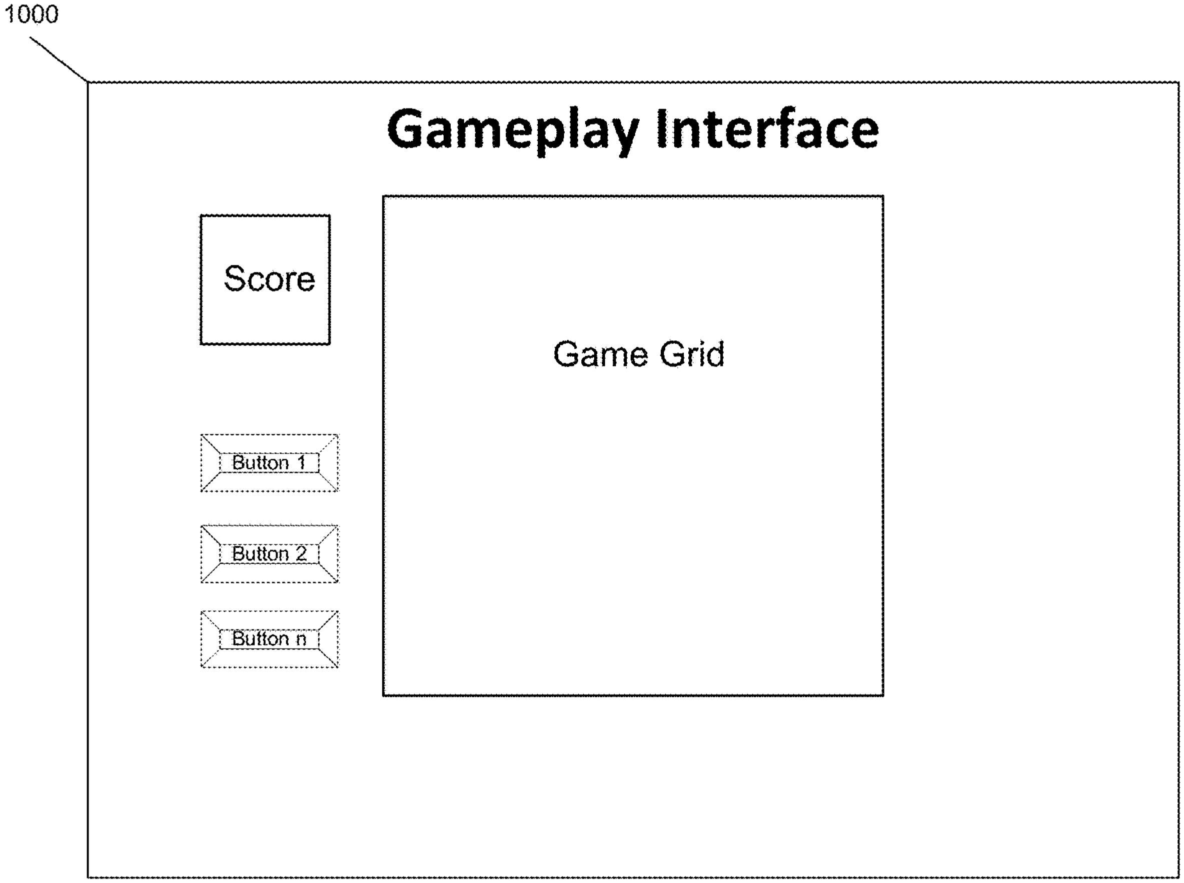
FIG. 10 depicts an illustrative graphical user interface generated as part of executing logic training software utilizing a virtual sensor-based application in accordance with one or more example arrangements.

Referring to FIG. 10, the game interface 1000 may include information, visual elements, selectable elements, and/or other information and/or elements corresponding to the logic training software utilizing a sensor-based application described herein. For example, the game interface 1000 may comprise a game grid (e.g., the game grid generated at step 206, or the like), information such as a score for a game, and/or other information relating to the game. The game grid may comprise a plurality of tiles, a plurality of sensors, and/or other aspects of a game grid as described herein. The game interface 1000 may also display interface elements or selectable options requesting user input. For example, the game interface 1000 may display one or more of: an information entry field, a button or buttons, toggle or toggles, check box or boxes, and/or other interface elements. For example, as illustrated in FIG. 10, the interface elements may be one or more buttons the user might toggle or select activate a game mechanic (e.g., a free reveal mode, a safe reveal mode, a sensor placement mode, a sensor activation mode, and/or other game mechanics). The game interface 1000 may comprise an indicator of a currently selected game mechanic (e.g., a free reveal mode, a safe reveal mode, a sensor placement mode, a sensor activation mode, a strike mode, and/or other game mechanics). Additionally or alternatively, the game interface 1000 may be configured to receive user input (e.g., computer mouse inputs, keyboard inputs, mobile tap inputs, mobile strike inputs, and/or other user inputs) affecting the game grid. For example, the game interface 1000 may be configured to receive user input revealing a tile, placing a sensor, enabling a sensor, and/or performing other functions as described herein (e.g., with respect to the main loop described with respect to FIGS. 3-4, the reveal logic described with respect to FIG. 5, and/or the user interfaces described with respect to FIGS. 11A-11I).

Referring again to FIG. 2, at step 210, based on outputting the user interface the computing device may complete initialization of the logic training software utilizing a virtual sensor-based application. Accordingly, the computing device may proceed to the main loop of the game, executing the logic training software utilizing a virtual sensor-based application as described herein.

Figure 3:
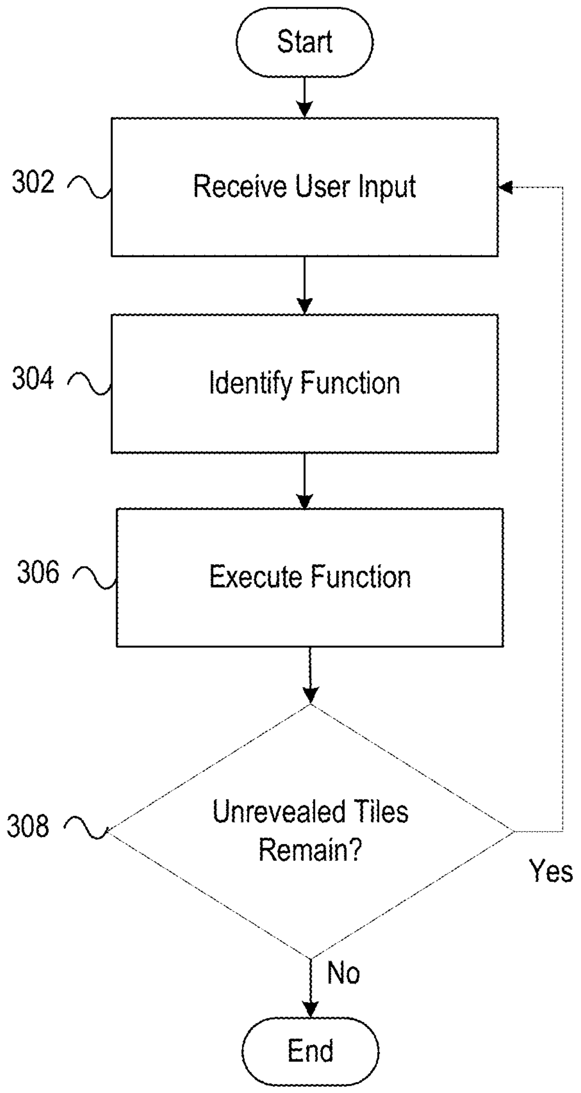
FIG. 3 depicts an illustrative method for executing logic training software utilizing a virtual sensor-based application in accordance with one or more example arrangements.

FIG. 3 depicts an illustrative method for executing logic training software utilizing a virtual sensor-based application in accordance with one or more example arrangements. Referring to FIG. 3, at step 302, the computing device may receive user input. For example, the computing device may receive user input via a graphical user interface as described herein with respect to FIGS. 2 and 10. In some examples, the computing device may receive user input via a touchpad, controller, stylus, computer mouse, keyboard, voice command, and/or by other methods of receiving user input.

At step 304, the computing device may identify the function of the user input. For example, the computing device may compare information related to the user input (e.g., selection of a particular position on the graphical user interface, game information related to a selected position, and/or other information) to parameters of the game in order to identify a function corresponding to the user input. In some examples, the function corresponding to the user input may comprise revealing a tile, selecting a reveal mode (e.g., safe reveal, free reveal, and/or other modes), opening a menu, closing an application window, and/or other functions described herein.

At step 306, based on identifying the function of the user input, the computing device may execute the function. In some examples, in executing the function, the computing device may activate a game effect. For example, based on user input selecting a tile to reveal, the selected tile may be revealed. Based on revealing the tile, the computing device may activate a game effect hidden by the tile. For example, the computing device may activate a positive game effect (e.g., an award, and/or other positive game effects described herein), a neutral game effect (e.g., changing a selection mode, and/or other neutral game effects described herein), and/or a negative game effect (e.g., a hazard, and/or other negative game effects described herein).

Figure 4:
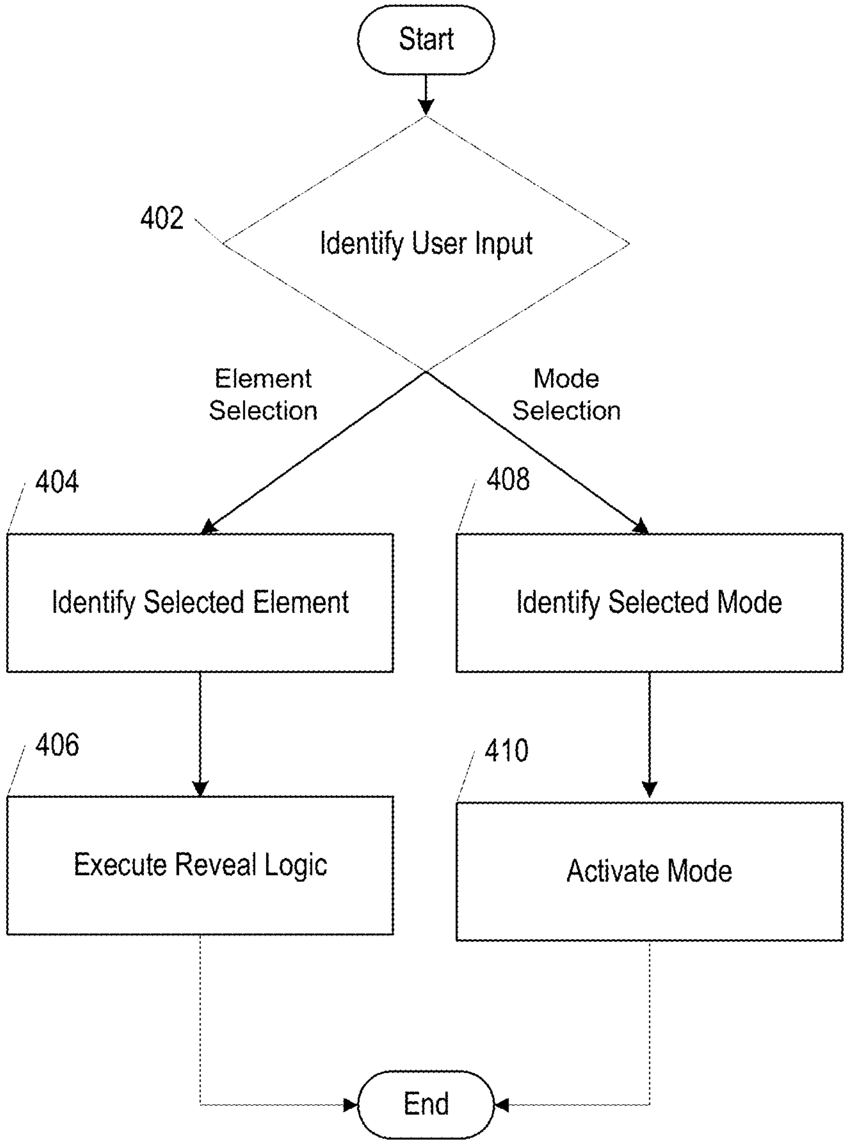
FIG. 4 depicts an illustrative method for responding to user input as part of executing logic training software utilizing a virtual sensor-based application in accordance with one or more example arrangements.

The functions performed as described at steps 304-306 may comprise one or more additional and/or subordinate steps for responding to user input. FIG. 4, for example, depicts an illustrative method for responding to user input as part of executing logic training software utilizing a virtual sensor-based application as described herein. Referring to FIG. 4, at step 402, the computing device may, based on and/or as part of receiving user input (e.g., as described herein with respect to FIG. 3 at step 302), identify the user input. For example, the computing device may identify user input received via a touchpad, controller, stylus, computer mouse, keyboard, voice command, and/or by other methods of receiving user input. In identifying the user input, the computing device may identify whether the user input corresponds to selection of an element of the game grid (e.g., a tile, a sensor, and/or other elements of the game grid), selection of a game mode (e.g., a safe reveal mode, a free reveal mode, a difficulty level, a sensor placement mode, and/or other game modes), and/or other features of the logic training software utilizing a virtual sensor-based application as described herein. The computing device may, based on identifying that the user input corresponds to selection of an element of the game grid, proceed to step 404 and identify the selected element. Additionally and/or alternatively the computing device may, based on identifying that the user input corresponds to selection of a reveal mode, identify the selected game mode. In these examples, the computing device may proceed to step 408 without performing any of the functions of steps 404-406.

At step 404, based on identifying that the user input corresponds to selection of an element, the computing device may identify the selected element. For example, the computing device may identify the selected element based on comparing information of the game grid with a location on the game grid corresponding to the user input. In some examples, the location on the game grid may correspond to a tile and the computing device may identify the tile as the selected element. Additionally and/or alternatively, the location on the game grid may correspond to a sensor and the computing device may identify the sense as the selected element.

At step 406, based on identifying the selected element, the computing device may execute reveal logic for the selected element. The reveal logic may comprise computer logic for activating one or more game effects based on selection of the selected element. For example, based on identifying a tile as the selected element, the computing device may reveal the tile and call, initiate, and/or otherwise execute reveal logic, such as the reveal logic illustrated in FIG. 5.

Figure 5:
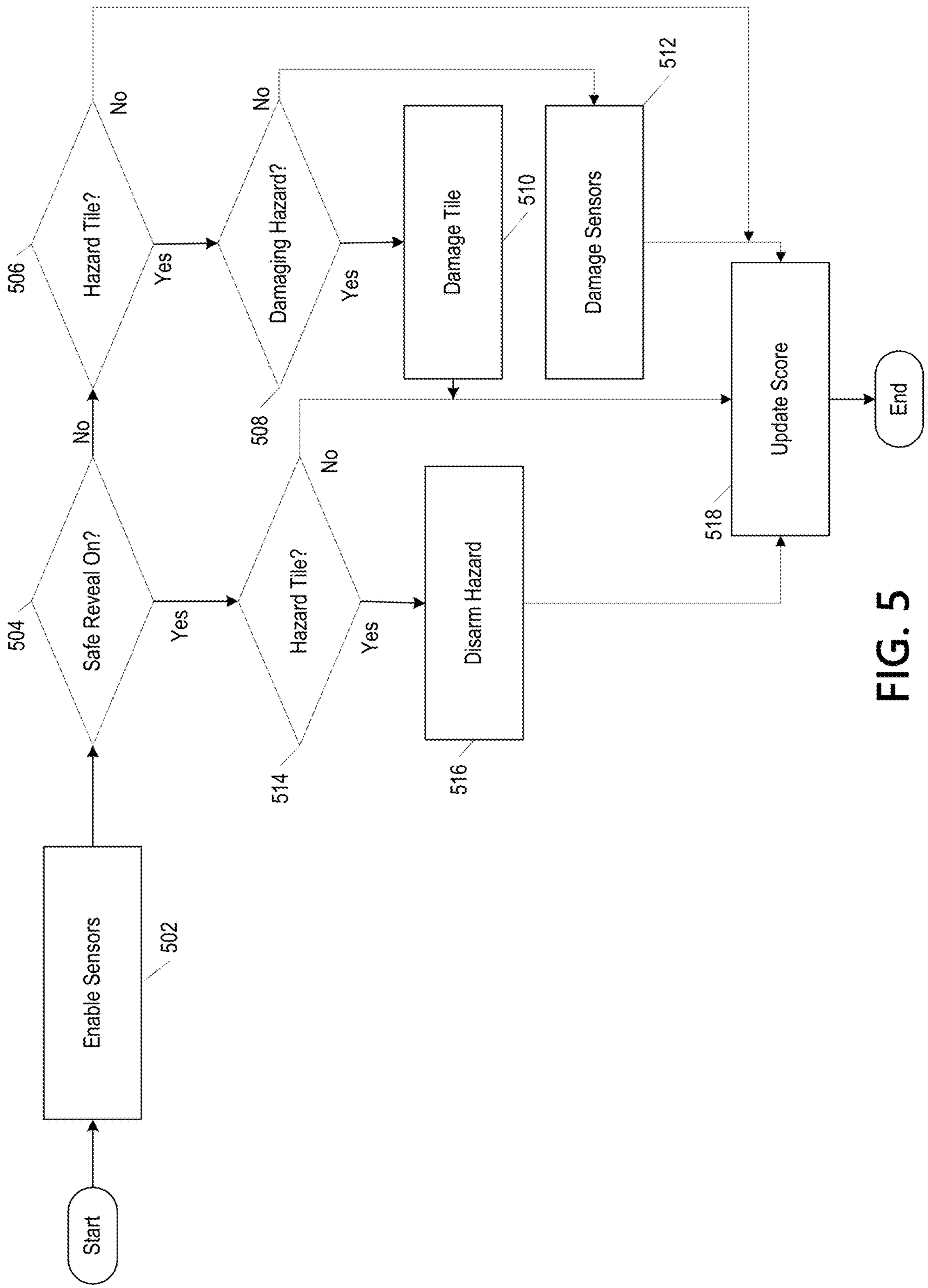
FIG. 5 depicts an illustrative method for executing a reveal function as part of logic training software utilizing a virtual sensor-based application in accordance with one or more example arrangements.

Referring to FIG. 5, at step 502, based on identifying a selected tile the computing device may enable, based on the user selection of the selected tile, one or more sensors. For example, the computing device may enable all sensors adjacent to and/or otherwise corresponding to the selected tile. In some examples, in enabling the one or more sensors, the computing device may update and/or otherwise modify sensors. For example, the computing device may modify a status of the one or more sensors (e.g., activating a sensor, changing an enabled attribute of each sensor from a false state to a true state, and/or otherwise modifying a status of the one or more sensors). Additionally and/or alternatively, in enabling the one or more sensors, the computing device may cause the one or more sensors to provide a visual cue indicating whether and how many corresponding tiles of the one or more sensors are hiding negative game effects. For example, the computing device cause the one or more sensors to display a color (e.g., based on a sensor hint attribute for each sensor) as a visual indicator as described herein (e.g., with respect to FIGS. 8A-8J). The color may, for example, be a red color based on information and/or logic indicating at least one corresponding tile of the one or more sensors hiding a negative game effect (e.g., a hazard, or the like). The color may, for example, be a green color based on information and/or logic indicating that none of the tiles corresponding to the one or more sensors are hiding a negative game effect.

At step 504, based on enabling the one or more sensors, the computing device may identify whether a safe reveal mode is activated. For example, the computing device may identify whether a safe reveal mode, configured to reveal tiles without triggering hazards corresponding to tiles, is activated. Based on identifying that the safe reveal mode is not activated, the computing device may proceed to step 506. Based on identifying that the safe reveal mode is activated, the computing device may proceed to step 514 without performing the functions described at steps 506-512.

At step 506, based on identifying that the safe reveal mode is activated, the computing device may identify whether the selected tile is a hazard tile. For example, the computing device may identify whether the tile comprises a hazard (e.g., a damaging hazard, a breaking hazard, and/or other types of hazard) as described herein (e.g., with respect to FIGS. 9A-9H, 7A-7B, and/or elsewhere throughout this disclosure). Based on identifying that the tile is a hazard tile, the computing device may proceed to step 508. Based on identifying that the tile is not a hazard tile, the computing device may proceed to step 518 without performing the functions described at steps 508-512.

At step 508, based on identifying that the tile is a hazard tile, the computing device may identify whether the hazard tile is a damaging hazard. For example, the computing device may read, parse, and/or otherwise analyze the attributes of the tile to identify whether the tile comprises a hazard effect attribute corresponding to a damaging effect. Based on identifying that the hazard is a damaging hazard, the computing device may proceed to step 510. Based on identifying that the hazard is not a damaging hazard, the computing device may identify that the hazard is a breaking hazard and proceed to step 512 without performing the functions described at step 510.

At step 510, based on identifying that the selected tile is a damaging hazard, the computing device may activate a game effect damaging the selected tile. For example, the computing device may reduce a score attribute of the selected tile to a value of zero, modify a graphical display corresponding to the selected tile, and/or otherwise damage the selected tile as described herein. Based on activating the game effect damaging the selected tile, the computing device may proceed to step 518.

At step 512, based on identifying that the selected tile is not a damaging hazard, the computing device may identify that the selected tile is a breaking hazard. Accordingly, the computing device may activate a game effect damaging one or more sensors corresponding to the selected tile. For example, the computing device may break (e.g., by disabling sensor hints) one or more sensors adjacent to and/or otherwise corresponding to the selected tile. Based on damaging the one or more sensors, the computing device may proceed to step 518.

At step 514, based on identifying that the safe reveal mode is activated, the computing device may identify whether the selected tile is a hazard tile. For example, the computing device may identify whether the tile comprises a hazard (e.g., a damaging hazard, a breaking hazard, and/or other types of hazard) as described herein (e.g., with respect to FIGS. 9A-9H, 7A-7B, and/or elsewhere throughout this disclosure). Based on identifying that the tile is a hazard tile, the computing device may proceed to step 516. Based on identifying that the tile is not a hazard tile, the computing device may proceed to step 518 without performing the functions described at step 516.

At step 516, based on identifying that the selected tile is a hazard tile, the computing device may disarm the hazard. For example, the computing device may modify and/or otherwise update attributes of the tile to disable a hazard attribute, remove a hazard attribute, and/or otherwise disarm the hazard. Based on disarming the hazard, the computing device may proceed to step 518.

At step 518, the computing device may update a score. In updating the score, the computing device may update a total score for the game based on activating a game effect as described herein. For example, based on activating a game effect damaging a selected tile (e.g., as described at step 510), the computing device may update the total score by reducing the total score based on a score attribute of the damaged tile, maintaining the total score based on the score attribute of the damaged tile having a value of zero, and/or otherwise updating the total score. Additionally and/or alternatively, the computing device may, based on activating a game effect damaging one or more sensors (e.g., as described at step 512), update the total score by increasing or reducing the total score based on a score attribute of the tile, and/or otherwise updating the total score. Additionally and/or alternatively, the computing device may, based on activating a game effect disarming a hazard (e.g., as described at step 516) update the total score by increasing the total score based on a score attribute of the tile, increasing the total score based on a value corresponding to disarming hazards, and/or otherwise updating the total score.

Figure 11A:
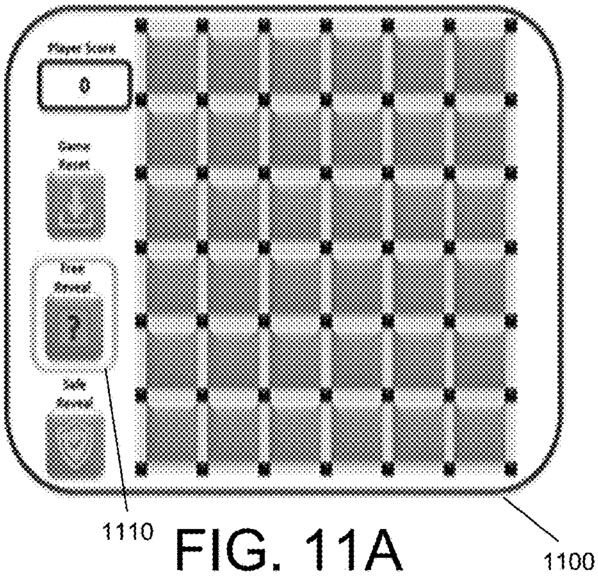
FIGS. 11A-11I depict illustrative user inputs at a graphical user interface generated as part of executing logic training software utilizing a virtual sensor-based application in accordance with one or more example arrangements.
Figure 11B:
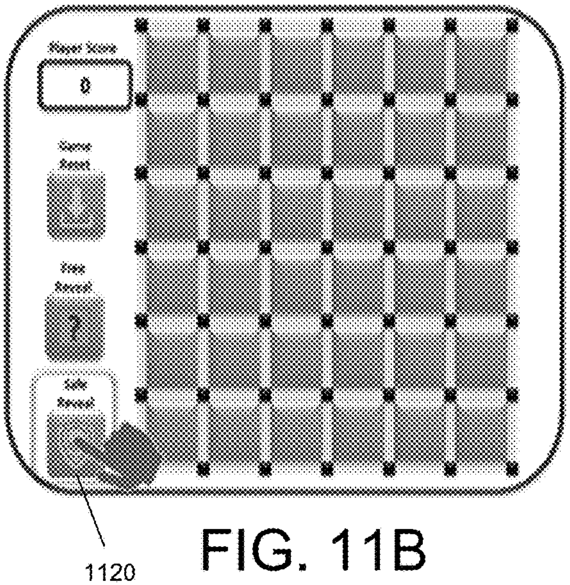
Figure 11C:
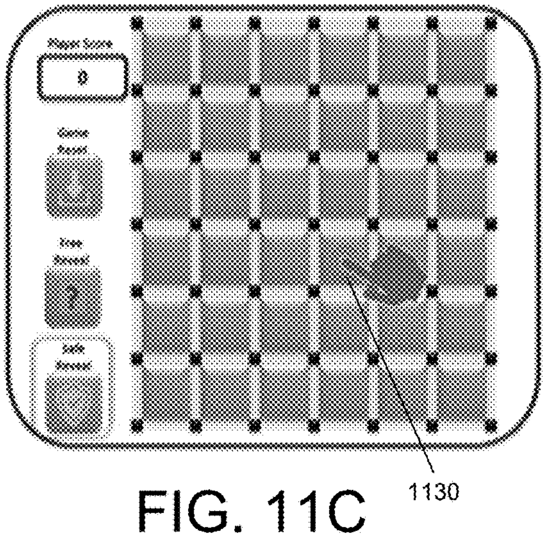

In some examples, the game grid may display visual indicators of one or more functions described herein with respect to FIGS. 3-5. For example, FIGS. 11A-11I depict illustrative user inputs at a graphical user interface generated as part of executing logic training software utilizing a virtual sensor-based application in accordance with one or more example arrangements as described herein. Referring to FIG. 11A, a game grid 1100 may initially display a free reveal mode toggle 1110 as the currently selected mode. The free reveal mode toggle 1110 may be selected based on user input, based on initiation of a game and output of the game grid 1100, and/or based on other factors. In some examples, the game grid may display indicators of user input selecting a game mode (e.g., as described at steps 408-410 of FIG. 4). For example, referring to FIG. 11B, the game grid 1100 may display one or more indicators of user input selecting a safe reveal mode toggle 1120. Additional and/or alternative mode toggles (e.g., a strike mode allowing for selection of multiple tiles at once, and/or other mode toggles) may be included without departing from the scope of this disclosure.

Figure 11D:
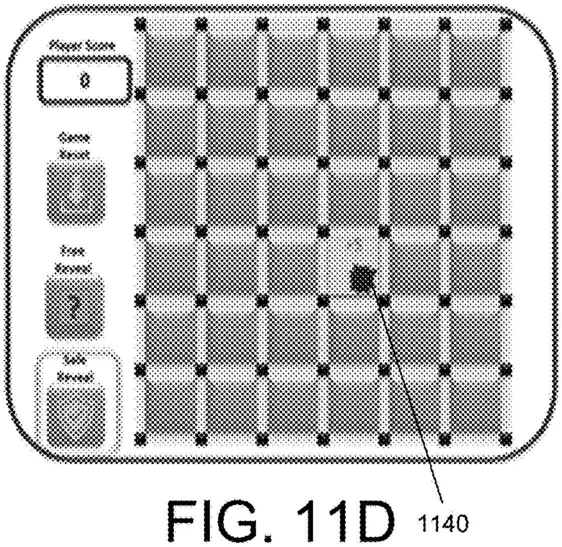
Figure 11E:
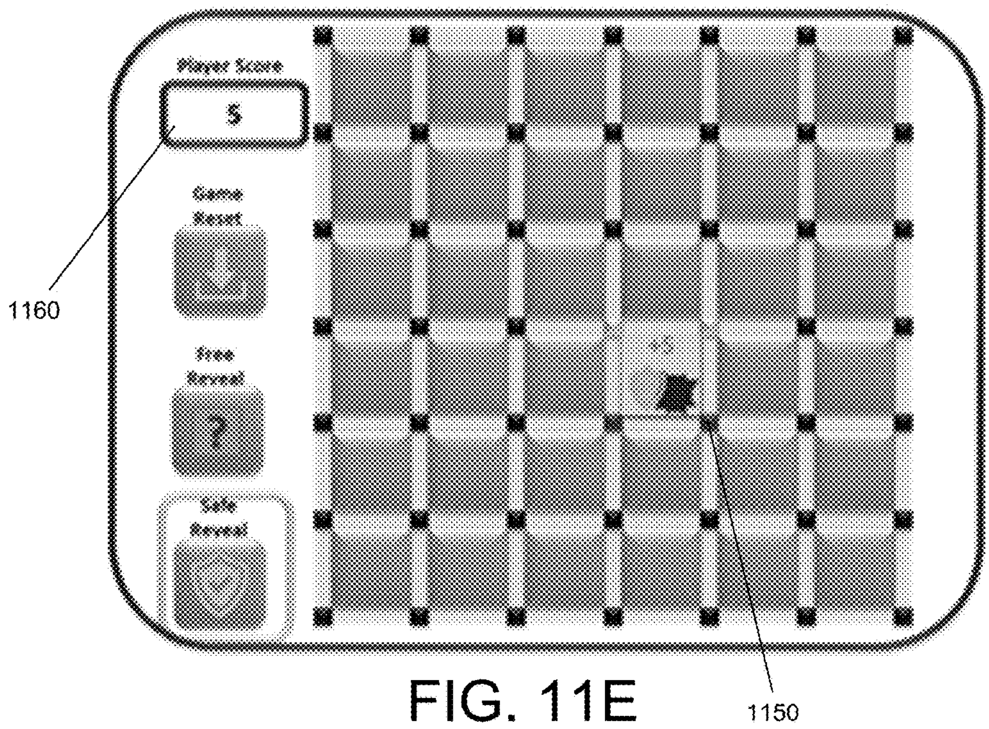
Figure 11F:
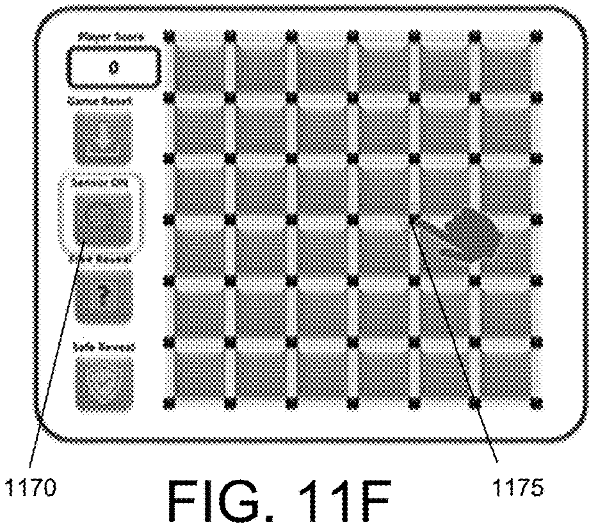
Figure 11G:
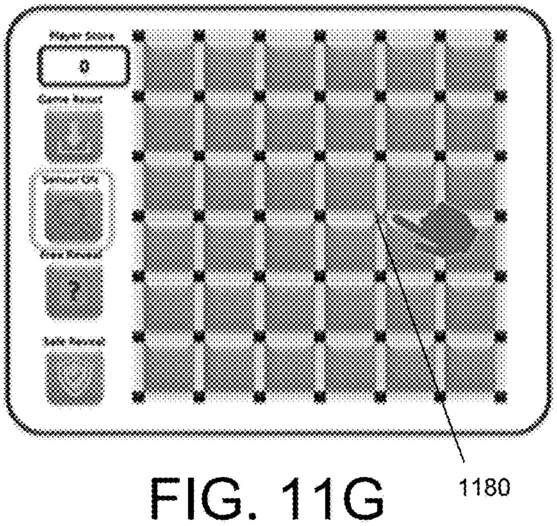
Figure 11H:
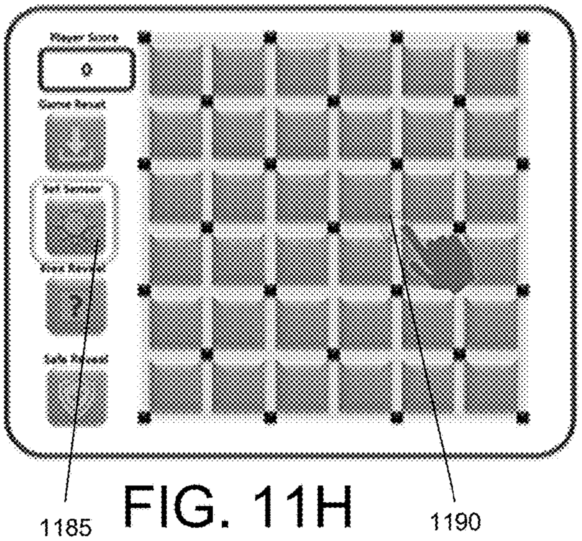
Figure 11I:
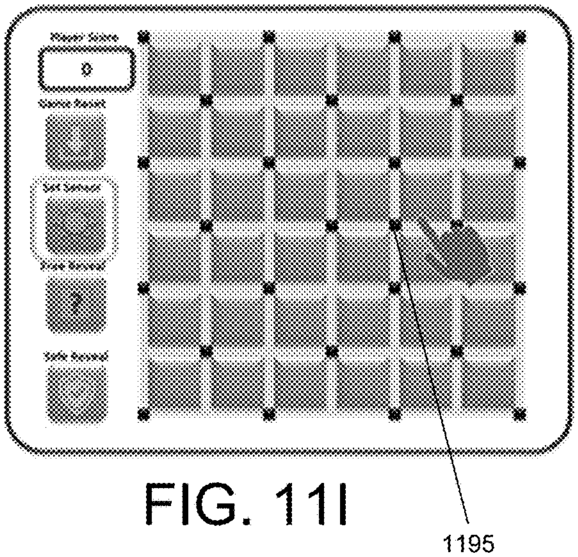

Additionally and/or alternatively, the game grid may display indicators of user input selecting a tile (e.g., as described at steps 404-406 of FIG. 4). For example, referring to FIG. 11C, a game grid 1100 may display indicators of users selecting, via user input, a hidden tile 1130 (e.g., during a safe reveal mode, as described at steps 504 and 514 of FIG. 5). Additionally and/or alternatively, the game grid may display indicators of activated game effects hidden by a selected tile. For example, the game grid may display indicators of activated game effects associated with revealing a hazard tile in safe reveal mode, as illustrated in FIGS. 11D-11E. Referring to FIG. 11D, the game grid 1100 may display a visual indicator (e.g., an image, graphic, or the like) of a damaging hazard 1140 revealed in safe mode.

Referring to FIG. 11E, the game grid 1100 may display (e.g., after disarming the hazard and updating the score as described at steps 516-518 of FIG. 5) visual indicators of enabled sensors 1150, an updated total score 1160, and/or other effects of revealing the selected tile. It should be understood that the indicators described herein are merely examples and that one or more additional and/or alternative indicators of additional and/or alternative user inputs, game effects, score updates, and/or other gameplay elements described herein may be displayed without departing from the scope of this disclosure.

It should be understood that the reveal logic described herein with respect to FIG. 5 is an illustrative example. Additional and/or alternative steps, functions, and/or methods may be used without departing from the scope of this disclosure. For example, in some arrangements, additional and/or alternative game modes may be included in the gameplay loop, reveal logic, and/or game grid. In some examples, an alternative game mode may comprise a sensor enable mode. The sensor enable mode may comprise logic, instructions, or the like configured to receive user input selecting a sensor and activating a corresponding game effect. For example, referring to FIG. 11F, a game grid 1100 may display a sensor enable mode toggle 1170. In some examples, the computing device may receive user input selecting a disabled sensor 1175 while sensor enable mode toggle 1170 is activated. The computing device may, based on the user input, enable the disabled sensor 1175. For example, referring to FIG. 11G, the computing device may enable sensor 1180 by causing enabled sensor 1180 to display a color indicating whether at least one tile adjacent to the enabled sensor 1180 is a hazard tile.

Additionally and/or alternatively, in some examples, the alternative game mode may comprise a set sensor mode. The set sensor mode may comprise logic, instructions, or the like configured to receive user input selecting a specific location on a game grid for placement of a sensor. For example, referring to FIG. 11H, a game grid 1100 may display a set sensor mode toggle 1185. In some examples, the computing device may receive user input selecting a location 1190 on the game grid without a sensor. Based on receiving the user input selecting the location 1190, the computing device may modify and/or otherwise update the game grid 1100 such that a sensor configured to perform one or more functions described herein is placed at location 1190. For example, referring to FIG. 11I, the game grid 1100 may display a new sensor 1195 comprising the same functionality as other sensors displayed on the game grid 1100.

It should be understood that the alternative game modes described herein are merely illustrative examples. It should also be understood that one or more additional and/or alternative game modes, comprising additional and/or alternative steps, may be utilized without departing from the scope of this disclosure.

Referring again to FIG. 4, at step 408, the computing device may, based on identifying the selected game mode, activate the selected game mode. For example, the computing device may activate a free reveal mode, a safe reveal mode, a set sensor mode, a strike mode, a sensor enable mode, and/or any other game modes.

Referring again to FIG. 3, at step 308, the computing device may, based on identifying and executing one or more functions based on user input (e.g., using the methods described herein with respect to FIGS. 4 and 5), identify whether any unrevealed tiles remain. Based on identifying that at least one unrevealed tile remains on the game grid, the computing device may repeat the functions described with respect to FIGS. 3-5 until some predetermined condition (e.g., an end game condition) has been met. The predetermined condition may be and/or comprise depletion of a threshold number of allowed user inputs (e.g., the depletion of a predetermined number of allowed free reveal actions, or the like), revealing all the tiles on the game grid, or revealing a threshold number of tiles corresponding to a negative game effect (e.g., a hazard tile, or the like). For example, the computing device may execute a gameplay loop performing the functions described herein with respect to FIGS. 3-5. Based on identifying a predetermined condition, such as that no unrevealed tiles remain on the game grid, the computing device may proceed to end the game (e.g., by terminating a virtual sensor-based application as described herein).

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing devices discussed above may be combined into a single computing platform, and the various functions of each computing device may be performed by the single computing platform. In such arrangements, any and/or all of the above-discussed communications between computing devices may correspond to data being accessed, moved, modified, updated, and/or otherwise used by the single computing platform. Additionally or alternatively, one or more of the computing devices discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A method comprising:

identifying, by a computing device, a game grid for a field of play, wherein the game grid comprises:

a plurality of tiles, wherein each tile, of the plurality of tiles, corresponds to a score and comprises at least one game effect; and a plurality of sensors, wherein each sensor, of the plurality of sensors, comprises a different user interface element positioned at vertices of at least two tiles of the plurality of tiles, and wherein a first location of a first sensor of the plurality of sensors is selected, by a user, using user input;

outputting, by the computing device, the game grid for display via a display device by causing output, by the display device, of a user interface comprising the game grid, the plurality of tiles, and the plurality of sensors;

receiving, via a user input device of the computing device, user input identifying a first tile;

activating a game effect associated with the first tile;

updating at least one sensor corresponding to the first tile, wherein updating the at least one sensor comprises:

modifying display of a first user interface element of the at least one sensor; and modifying a status of the at least one sensor; and repeating the receiving, activating and updating until a predetermined condition is met.

2. The method of claim 1, further comprising:

enabling, based on the user input, one or more sensors of the plurality of sensors, wherein the enabling the one or more sensors comprises modifying display of the user interface to indicate whether and how many corresponding tiles are hiding negative game effects; and repeating the enabling until the predetermined condition is met.

3. The method of claim 1, wherein the game effect associated with the first tile comprises:

a first version of the game effect corresponding to a first tile reveal mode; and a second version of the game effect corresponding to a second tile reveal mode.

4. The method of claim 1, further comprising:

updating, based on activating the game effect and based on a score corresponding to the first tile, a total score.

5. The method of claim 1, wherein activating the game effect comprises reducing a score corresponding to the first tile to a value of zero.

6. The method of claim 1, wherein activating the game effect comprises disabling one or more sensors corresponding to the first tile.

7. The method of claim 1, wherein the plurality of tiles comprises:

a plurality of tiles of a first size; and a plurality of tiles of a second size larger than the first size.

8. The method of claim 1, wherein at least one sensor of the plurality of sensors is configured to indicate a status of a non-adjacent tile.

9. The method of claim 1, wherein modifying the display of a first user interface element comprises changing a displayed color of the first user interface element.

10. The method of claim 1, wherein the predetermined condition comprises at least one of:

depletion of a threshold number of allowed user inputs, revealing all tiles, or revealing a threshold number of tiles corresponding to a negative game effect.

11. A computing device comprising:

at least one processor; and memory storing computer-readable instructions that, when executed by the at least one processor, configure the computing device to:

identify a game grid for a field of play, wherein the game grid comprises:

a plurality of tiles, wherein each tile, of the plurality of tiles, corresponds to a score and comprises at least one game effect; and a plurality of sensors, wherein each sensor, of the plurality of sensors, comprises a different user interface element positioned at vertices of at least two tiles of the plurality of tiles, and wherein a first location of a first sensor of the plurality of sensors is selected, by a user, using user input;

output the game grid for display via a display device by causing output, by the display device, of a user interface comprising the game grid, the plurality of tiles, and the plurality of sensors;

receive, via a user input device, user input identifying a first tile;

activate a game effect associated with the first tile;

update at least one sensor corresponding to the first tile, wherein updating the at least one sensor comprises:

modifying display of a first user interface element of the at least one sensor; and modifying a status of the at least one sensor; and repeat the receiving, activating and updating until a predetermined condition is met.

12. The computing device of claim 11, wherein the memory stores additional computer-readable instructions that, when executed by the at least one processor, further configure the computing device to:

enable, based on the user input, one or more sensors of the plurality of sensors, wherein the enabling the one or more sensors comprises modifying display of the user interface to indicate whether and how many corresponding tiles are hiding negative game effects; and repeat the enabling until the predetermined condition is met.

13. The computing device of claim 11, wherein the game effect associated with the first tile comprises:

a first version of the game effect corresponding to a first tile reveal mode; and a second version of the game effect corresponding to a second tile reveal mode.

14. The computing device of claim 11, wherein the memory stores additional computer-readable instructions that, when executed by the at least one processor, further configure the computing device to:

update, based on activating the game effect and based on a score corresponding to the first tile, a total score.

15. The computing device of claim 11, wherein the plurality of tiles comprises:

a plurality of tiles of a first size; and a plurality of tiles of a second size larger than the first size.

16. The computing device of claim 11, wherein the one or more tiles, of the plurality of tiles, comprise non-adjacent tiles.

17. One or more non-transitory computer readable media storing computer readable instructions that, when executed by a processor, cause a system to perform:

identifying a game grid for a field of play, wherein the game grid comprises:

a plurality of tiles, wherein each tile, of the plurality of tiles, corresponds to a score and comprises at least one game effect; and a plurality of sensors, wherein each sensor, of the plurality of sensors, comprises a different user interface element positioned at vertices of at least two tiles of the plurality of tiles, and wherein a first location of a first sensor of the plurality of sensors is selected, by a user, using user input;

outputting the game grid to a display device by causing output, by the display device, of a user interface comprising the game grid, the plurality of tiles, and the plurality of sensors;

receiving, via a user input device, user input identifying a first tile;

activating a game effect associated with the first tile;

updating at least one sensor corresponding to the first tile, wherein updating the at least one sensor comprises:

modifying display of a first user interface element of the at least one sensor; and modifying a status of the at least one sensor; and repeating the receiving, activating and updating until a predetermined condition is met.

18. The one or more non-transitory computer readable media of claim 17, storing further instructions that, when executed by the processor, cause the system to perform:

enabling, based on the user input, one or more sensors of the plurality of sensors, wherein the enabling the one or more sensors comprises modifying display of the user interface to indicate whether and how many corresponding tiles are hiding negative game effects; and repeating the enabling until the predetermined condition is met.

19. The one or more non-transitory computer readable media of claim 17, wherein the game effect associated with the first tile comprises:

a first version of the game effect corresponding to a first tile reveal mode; and a second version of the game effect corresponding to a second tile reveal mode.

20. The one or more non-transitory computer readable media of claim 17, wherein the plurality of tiles comprises:

a plurality of tiles of a first size; and a plurality of tiles of a second size larger than the first size.

* * * * *